US009994959B2

(12) United States Patent
Laramie et al.

(10) Patent No.: US 9,994,959 B2
(45) Date of Patent: Jun. 12, 2018

(54) CERAMIC/POLYMER MATRIX FOR ELECTRODE PROTECTION IN ELECTROCHEMICAL CELLS, INCLUDING RECHARGEABLE LITHIUM BATTERIES

(71) Applicant: Sion Power Corporation, Tucson, AZ (US)

(72) Inventors: Michael G. Laramie, Tucson, AZ (US); Yuriy V. Mikhaylik, Tucson, AZ (US); James A. Phipps, Tucson, AZ (US); Veronika G. Viner, Tucson, AZ (US)

(73) Assignee: Sion Power Corporation, Tucson, AZ (US)

(*) Notice: Subject to any disclaimer, the term of this patent is extended or adjusted under 35 U.S.C. 154(b) by 335 days.

(21) Appl. No.: 14/323,269

(22) Filed: Jul. 3, 2014

(65) Prior Publication Data
US 2015/0010804 A1 Jan. 8, 2015

Related U.S. Application Data

(60) Provisional application No. 61/842,936, filed on Jul. 3, 2013.

(51) Int. Cl.
*H01M 2/16* (2006.01)
*C25B 11/02* (2006.01)
(Continued)

(52) U.S. Cl.
CPC .............. *C25B 11/02* (2013.01); *H01M 2/145* (2013.01); *H01M 2/166* (2013.01);
(Continued)

(58) Field of Classification Search
CPC .................. C25B 11/02; H01M 2/145; H01M 2300/0094; H01M 2/1673; H01M 2/1686; H01M 2/166; H01M 10/0525; H01M 4/0421; H01M 4/0407; H01M 4/1395; H01M 4/0414; H01M 4/0426; H01M 4/0428; H01M 4/134; H01M 4/366;
(Continued)

(56) References Cited

U.S. PATENT DOCUMENTS 4,664,991 A 5/1987 Perichaud et al.
4,739,018 A 4/1988 Armand et al.
(Continued)

FOREIGN PATENT DOCUMENTS

JP 2008-103259 A 5/2008
JP 2009-516325 4/2009
(Continued)

OTHER PUBLICATIONS

International Search Report and Written Opinion dated Oct. 27, 2014 for Application No. PCT/US2014/045392.
(Continued)

*Primary Examiner* — Mark F. Huff
*Assistant Examiner* — Omar M Kekia
(74) *Attorney, Agent, or Firm* — Wolf, Greenfield & Sacks, P.C.

(57) ABSTRACT

Articles and methods for forming ceramic/polymer composite structures for electrode protection in electrochemical cells, including rechargeable lithium batteries, are presented.

21 Claims, 7 Drawing Sheets

(51) Int. Cl.
*H01M 2/14* (2006.01)
*H01M 4/1395* (2010.01)
*H01M 4/134* (2010.01)
*H01M 4/38* (2006.01)
*H01M 4/62* (2006.01)
*H01M 10/052* (2010.01)
*H01M 10/0525* (2010.01)
*H01M 4/04* (2006.01)
*H01M 4/36* (2006.01)
*H01M 4/02* (2006.01)

(52) U.S. Cl.
CPC ....... *H01M 2/1673* (2013.01); *H01M 2/1686* (2013.01); *H01M 4/134* (2013.01); *H01M 4/1395* (2013.01); *H01M 4/382* (2013.01); *H01M 4/62* (2013.01); *H01M 4/622* (2013.01); *H01M 10/052* (2013.01); *H01M 4/0407* (2013.01); *H01M 4/0414* (2013.01); *H01M 4/0421* (2013.01); *H01M 4/0426* (2013.01); *H01M 4/0428* (2013.01); *H01M 4/366* (2013.01); *H01M 10/0525* (2013.01); *H01M 2004/021* (2013.01); *H01M 2300/0068* (2013.01); *H01M 2300/0082* (2013.01); *H01M 2300/0088* (2013.01); *H01M 2300/0091* (2013.01); *H01M 2300/0094* (2013.01)

(58) Field of Classification Search
CPC ........ H01M 4/382; H01M 4/62; H01M 4/622; H01M 10/052; H01M 2004/021; H01M 2300/0068; H01M 2300/0088; H01M 2300/0082; H01M 2300/0091
USPC ............................................ 429/144; 427/58
See application file for complete search history.

(56) References Cited

U.S. PATENT DOCUMENTS

| | | |
|---|---|---|
| 4,833,048 A | 5/1989 | DeJonghe et al. |
| 4,917,974 A | 4/1990 | DeJonghe et al. |
| 4,954,371 A | 9/1990 | Yializis |
| 5,162,175 A | 11/1992 | Visco et al. |
| 5,194,341 A | 3/1993 | Bagley et al. |
| 5,324,599 A | 6/1994 | Oyama et al. |
| 5,441,831 A | 8/1995 | Okamoto et al. |
| 5,516,598 A | 5/1996 | Visco et al. |
| 5,529,860 A | 6/1996 | Skotheim et al. |
| 5,538,812 A | 7/1996 | Lee et al. |
| 5,601,947 A | 2/1997 | Skotheim et al. |
| 5,648,187 A | 7/1997 | Skotheim |
| 5,681,615 A | 10/1997 | Affinito et al. |
| 5,690,702 A | 11/1997 | Skotheim et al. |
| 5,723,230 A | 3/1998 | Naoi et al. |
| 5,783,330 A | 7/1998 | Naoi et al. |
| 5,792,575 A | 8/1998 | Naoi et al. |
| 5,882,819 A | 3/1999 | Naoi et al. |
| 5,919,587 A | 7/1999 | Mukherjee et al. |
| 5,961,672 A | 10/1999 | Skotheim et al. |
| 6,117,590 A | 9/2000 | Skotheim et al. |
| 6,153,337 A | 11/2000 | Carlson et al. |
| 6,171,460 B1 | 1/2001 | Bill |
| 6,201,100 B1 | 3/2001 | Gorkovenko et al. |
| 6,214,061 B1 | 4/2001 | Visco et al. |
| 6,306,545 B1 | 10/2001 | Carlson et al. |
| 6,413,284 B1 | 7/2002 | Chu et al. |
| 6,413,285 B1 | 7/2002 | Chu et al. |
| 6,432,584 B1 | 8/2002 | Visco et al. |
| 6,737,197 B2 | 5/2004 | Chu et al. |
| 7,069,836 B1* | 7/2006 | Palicka ................. F41H 5/0421 109/49.5 |
| 7,070,632 B1 | 7/2006 | Visco et al. |
| 7,160,603 B2 | 1/2007 | Carlson |
| 7,175,937 B2 | 2/2007 | Cho et al. |
| 7,247,408 B2 | 7/2007 | Skotheim et al. |
| 8,087,309 B2 | 1/2012 | Kelley et al. |
| 8,114,171 B2 | 2/2012 | Visco et al. |
| 8,182,943 B2 | 5/2012 | Visco et al. |
| 8,202,649 B2 | 6/2012 | Visco et al. |
| 8,334,075 B2 | 12/2012 | Visco et al. |
| 2004/0142244 A1 | 7/2004 | Visco et al. |
| 2005/0008938 A1 | 1/2005 | Cho et al. |
| 2006/0115579 A1 | 6/2006 | Mukherjee et al. |
| 2006/0121345 A1 | 6/2006 | Yasuda et al. |
| 2006/0147801 A1 | 7/2006 | Yasuda et al. |
| 2006/0147802 A1 | 7/2006 | Yasuda et al. |
| 2006/0238203 A1 | 10/2006 | Kelley et al. |
| 2007/0221265 A1 | 9/2007 | Affinito et al. |
| 2007/0224502 A1 | 9/2007 | Affinito et al. |
| 2008/0187663 A1 | 8/2008 | Affinito |
| 2008/0318128 A1 | 12/2008 | Simoneau et al. |
| 2009/0155676 A1* | 6/2009 | Zhamu ................. H01M 2/166 429/129 |
| 2009/0200986 A1 | 8/2009 | Kopera |
| 2010/0035128 A1 | 2/2010 | Scordilis-Kelley et al. |
| 2010/0112454 A1* | 5/2010 | Visco ..................... H01B 1/122 429/246 |
| 2010/0129699 A1 | 5/2010 | Mikhaylik et al. |
| 2010/0239914 A1 | 9/2010 | Mikhaylik et al. |
| 2010/0327811 A1 | 12/2010 | Affinito et al. |
| 2011/0033784 A1 | 2/2011 | Ljungcrantz |
| 2011/0059361 A1 | 3/2011 | Wilkening et al. |
| 2011/0068001 A1 | 3/2011 | Affinito et al. |
| 2011/0070491 A1 | 3/2011 | Campbell et al. |
| 2011/0070494 A1 | 3/2011 | Campbell et al. |
| 2011/0076560 A1 | 3/2011 | Scordilis-Kelley et al. |
| 2011/0177398 A1 | 7/2011 | Affinito et al. |
| 2011/0206992 A1 | 8/2011 | Campbell et al. |
| 2012/0048729 A1 | 3/2012 | Mikhaylik et al. |
| 2012/0070746 A1 | 3/2012 | Mikhaylik et al. |
| 2012/0219842 A1 | 8/2012 | Visco et al. |
| 2012/0270112 A1 | 10/2012 | Visco et al. |
| 2012/0276459 A1 | 11/2012 | Im et al. |
| 2012/0305390 A1* | 12/2012 | Fredenberg ......... B81C 99/0085 204/290.03 |
| 2013/0004852 A1 | 1/2013 | Visco et al. |
| 2013/0017441 A1 | 1/2013 | Affinito et al. |
| 2013/0095380 A1 | 4/2013 | Affinito et al. |
| 2013/0143096 A1 | 6/2013 | Affinito et al. |
| 2013/0224601 A1 | 8/2013 | Burnside et al. |
| 2013/0252103 A1 | 9/2013 | Mikhaylik et al. |
| 2013/0280605 A1 | 10/2013 | Affinito et al. |
| 2014/0123477 A1 | 5/2014 | Safont Sempere et al. |
| 2014/0205912 A1 | 7/2014 | Skotheim et al. |
| 2015/0086837 A1 | 3/2015 | Laramie et al. |

FOREIGN PATENT DOCUMENTS

| | | |
|---|---|---|
| JP | 2009-529762 A | 8/2009 |
| JP | 2010-239122 A | 10/2010 |
| JP | 2011-253673 A | 12/2011 |
| JP | 2012-022835 A | 2/2012 |
| JP | 2014-086174 A | 5/2014 |
| WO | WO 1999/033125 A1 | 7/1999 |
| WO | WO 1999/033130 A1 | 7/1999 |
| WO | WO 2007/075867 A2 | 7/2007 |
| WO | WO 2009/017726 A1 | 2/2009 |
| WO | WO 2009/042071 A9 | 4/2009 |
| WO | WO 2009/043011 A1 | 4/2009 |
| WO | WO 2009/054987 A1 | 4/2009 |
| WO | WO 2009/089018 A2 | 7/2009 |
| WO | WO 2011/028251 A2 | 3/2011 |
| WO | WO 2012/174393 A1 * | 12/2012 ............. H01M 2/06 |
| WO | WO 2015/126379 A1 | 8/2015 |

OTHER PUBLICATIONS

International Preliminary Report on Patentability for Application No. PCT/US2014/045392 dated Jan. 14, 2016.

Alamgir et al., Lithium Batteries, New Materials, Developments and Perspectives, Chapter 3. Elsevier, Amsterdam. 1994; 93-136.

(56) References Cited

OTHER PUBLICATIONS

Dominey, Lithium Batteries, New Materials, Developments and Perspectives, Chapter 4. Elsevier, Amsterdam. 1994; 137-165.
Extended European Search Report dated Nov. 25, 2016 for Application No. EP 14820459.7.

* cited by examiner

CERAMIC/POLYMER MATRIX FOR ELECTRODE PROTECTION IN ELECTROCHEMICAL CELLS, INCLUDING RECHARGEABLE LITHIUM BATTERIES

RELATED APPLICATIONS

This application claims priority to U.S. Provisional Application No. 61/842,936, filed Jul. 3, 2013, which is incorporated herein by reference in its entirety for all purposes.

STATEMENT REGARDING FEDERALLY SPONSORED RESEARCH AND DEVELOPMENT

This invention was made with government support under Grant No. DE-AR0000067 awarded by the Department of Energy ARPA-E program (ARPA-E BEEST DE-FOA-00000207-1536). The government has certain rights in the invention.

FIELD

Articles and methods for forming composite structures for protection of electrodes in electrochemical cells, including rechargeable lithium batteries, are provided.

BACKGROUND

There has been considerable interest in recent years in developing high energy density batteries with lithium containing anodes. Lithium metal is particularly attractive as the anode of electrochemical cells because of its extremely light weight and high energy density, compared for example to anodes, such as lithium intercalated carbon anodes, where the presence of non-electroactive materials increases weight and volume of the anode, and thereby reduces the energy density of the cells, and to other electrochemical systems with, for example, nickel or cadmium electrodes. Lithium metal anodes, or those comprising mainly lithium metal, provide an opportunity to construct cells which are lighter in weight, and which have a higher energy density than cells such as lithium-ion, nickel metal hydride or nickel-cadmium cells. These features are highly desirable for batteries for portable electronic devices such as cellular phones and laptop computers where a premium is paid for low weight. Unfortunately, the reactivity of lithium and the associated cycle life, dendrite formation, electrolyte compatibility, fabrication and safety problems have hindered the commercialization of lithium cells.

Although there have been developments in protected lithium anodes, improvements are needed.

SUMMARY

Articles and methods for forming composite structures for protection of electrodes in electrochemical cells, including rechargeable lithium batteries, are provided. The subject matter herein involves, in some cases, interrelated products, alternative solutions to a particular problem, and/or a plurality of different uses of one or more systems and/or articles.

In one aspect, an electrode for an electrochemical cell is provided. The electrode comprises a base layer comprising an active electrode species, and a protective structure positioned to protect the electrode from an electrolyte when the electrode is arranged in an electrochemical cell, the protective structure having a first side facing the active electrode species, and a second side arranged to face an electrolyte. The protective structure comprises at least a first and second composite layer, each layer comprising a polymer matrix having a plurality of cavities, and a ceramic material filling at least two cavities. Each ceramic-filled cavity is in ionic communication with the base layer. The protective structure has an average ionic conductivity of at least $10^{-7}$ S/cm.

In another embodiment, an electrode for an electrochemical cell comprises a base layer comprising an active electrode species, and a protective structure including at least a first composite layer comprising a patterned array of cavities within a matrix, wherein a polymer or a ceramic material forms the matrix, and the other of the polymer or ceramic material fills at least a portion of the cavities. The protective structure has an average ionic conductivity of at least $10^{-7}$ S/cm.

In another embodiment, an electrode comprises a base layer comprising an active electrode species and a protective structure positioned to protect the electrode from an electrolyte when the electrode is arranged in an electrochemical cell, the protective structure having a first side facing the active electrode species, and a second side arranged to face an electrolyte, wherein the protective structure comprises at least a first and second composite layer, each layer comprising a continuous polymer matrix having a plurality of cavities and a ceramic material filling at least two cavities, wherein each ceramic-filled cavity is in ionic communication with the base layer, wherein the protective structure has an average ionic conductivity of at least $10^{-7}$ S/cm.

In another aspect, an electrode for an electrochemical cell is provided that comprises a base layer comprising an active electrode species and a protective structure comprising a polymer and a ceramic material, wherein the protective structure has an average ionic conductivity of at least $10^{-7}$ S/cm and/or a polymer content of at least 2% by weight.

In yet another aspect, a method of fabricating a protective structure on an electrode is provided. The method comprising forming a base layer comprising an active electrode species attached to a protective structure, wherein the protective structure is formed by positioning on a substrate at least one layer of a matrix comprising a polymer or a ceramic material, the matrix comprising a patterned array of cavities, and filling at least a portion of the cavities with the other of a polymer or a ceramic material to form a composite layer. The composite layer has an average ionic conductivity of at least $10^{-7}$ S/cm.

In another embodiment, a method comprises providing, on at least one surface of the electrode, a base component comprising a continuous polymer matrix having cavities, and impregnating the base component with a ceramic material such that the composite structure has an average ionic conductivity of at least $10^{-7}$ S/cm.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
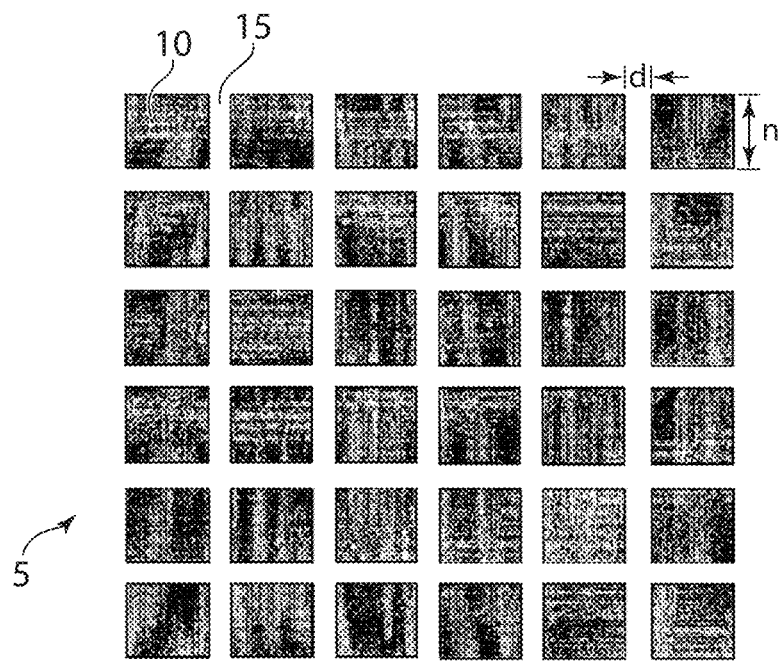
FIG. 1 is a schematic illustration of a top view of a protective structure according to one set of embodiments.

Articles and methods for forming composite structures for electrode protection in electrochemical cells, including rechargeable lithium batteries, are provided. Certain embodiments relate to an electrode with a protective structure that can inhibit passage of one or more undesirable components of an electrolyte that can adversely affect the electrode. Advantageously, in some embodiments, the protective structure may also promote passage of one or more desirable electrolyte components (e.g., metal ions) and may have favorable mechanical characteristics that reduce the likelihood of structural and functional failure of the protective structure. In some embodiments, the protective structure is positioned to protect the electrode from an electrolyte when the electrode is arranged in an electrochemical cell, the protective structure having a first side facing a base layer of the electrode comprising an active electrode species and a second size arranged to face an electrolyte. The protective structure may, in certain cases, comprise at least a first and second composite layer, each layer comprising a polymer matrix having a plurality of cavities and an inorganic material filling at least two cavities, wherein each inorganic material-filled cavity is in ionic communication with a base layer comprising an active electrode species. The cavities may be arranged in a pattern within a composite layer of the protective structure.

The composite structures described above and herein may provide a number of advantages over prior electrode protective structures. For example, the plurality of inorganic material-filled cavities may provide a plurality of ionic pathways from one side of the protective structure to the other (i.e., between the electrode and the electrolyte). While certain ceramic/glassy cells or layers may include pinholes, cracks, and/or grain boundary defects that can propagate throughout the entire cell or layer, the presence of a plurality of ionic pathways can minimize the effects of a defect in any one ionic pathway. Accordingly, in the structures described herein, when defects exist, they are typically significantly less detrimental than they would be in a protective structure comprising one or more continuous ceramic layers. For instance, because the defects may be isolated (e.g., surrounded at least partially by a polymeric material), propagation of the defects to other ionic pathways (e.g., inorganic material-filled cavities) can be reduced or avoided.

Another advantage of the composite protective structure as described herein relates to the favorable mechanical properties of the structure. The positioning of inorganic material-filled cavities or cells within a polymer matrix can decrease the susceptibility of the inorganic material-filled cavities to cracking failure mechanisms. The presence of the polymer matrix can provide flexibility and strength, allowing the composite structure to be more flexible, more robust and/or more easily handled than, for example, a continuous inorganic or ceramic layer. Advantageously, since there is a plurality of ionic pathways through the inorganic material, there is no requirement that the polymer be ionically conductive. The polymer may be a non-ironically conductive polymer. In other embodiments, however, and ionically-conductive polymer may be used.

Examples of protective structures are now described.

FIG. 1 shows an illustrative embodiment of a top view of a protective structure 5. As illustrated, the protective structure includes at least one layer comprising a patterned array of cavities within a matrix, wherein a polymer or a ceramic material forms the matrix, and the other of the polymer or ceramic material fills at least a portion of the cavities. In this illustrative embodiment, the protective structure includes a 6×6 cell structure where inorganic material portions 10 may include, for example, an ionically conductive inorganic material (e.g., ceramic) having a dimension n on each side, which portions form filled-cavities within a matrix. Polymeric portions 15 of the structure have a dimension d, which form the matrix. As described in more detail below, the polymeric portions may be in the form of a non-conductive polymer mesh, or a conductive polymer mesh.

Figure 2:
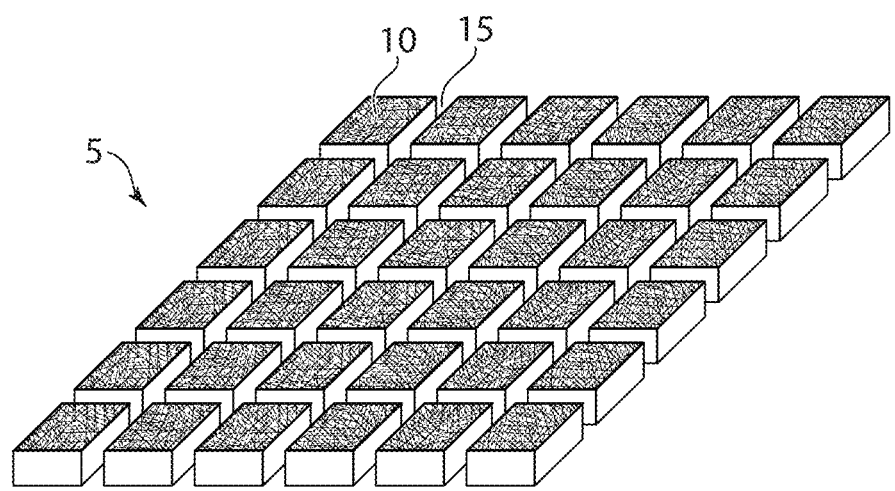
FIG. 2 is an angled view of the protective structure shown in FIG. 1 according to one set of embodiments.

FIG. 2 shows the same single layer protective structure 5 from a 30° viewing angle. Again, inorganic material portions 10 and polymeric portions 15 are shown. The depth of the blocks of the inorganic material portions would be variable, and can be adjusted, for example, via the initial coating of the polymer matrix. The protective structure may include a first side facing a base layer of the electrode comprising an active electrode species and a second size arranged to face an electrolyte. Additional layers may be positioned adjacent or on top of such a protective structure 5 as described in more detail below.

As used herein, when a layer is referred to as being "on", "on top of", or "adjacent" another layer, it can be directly on, on top of, or adjacent the layer, or an intervening layer may also be present. A layer that is "directly on", "directly adjacent" or "in contact with" another layer means that no intervening layer is present. Likewise, a layer that is positioned "between" two layers may be directly between the two layers such that no intervening layer is present, or an intervening layer may be present.

Figure 3:
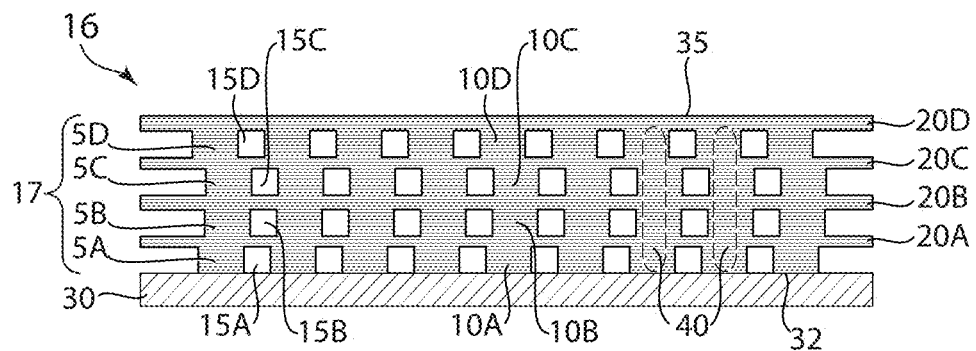
FIG. 3 is an illustrative embodiment showing an article including a protective structure having multiple layers according to one set of embodiments.

FIG. 3 is an illustrative embodiment showing an article 16 including a protective structure 17. Protective structure 17 includes multiple layers 5A-5D of composite materials separated by layers of inorganic material 20A-20D. In this illustrative embodiment, each layer of composite material (e.g., layers 5A-5D) can include inorganic material portions 10A-10D separated by polymeric portions 15A-15D.

As illustrated, the protective structure includes at least one layer (e.g., a first composite layer) comprising a patterned array of cavities within a matrix, wherein a polymer or a ceramic material forms the matrix, and the other of the polymer or ceramic material fills at least a portion (or all) of the cavities. A second composite layer may be formed by positioning on the first layer (or on an intervening layer), a second layer of a matrix comprising a polymer or a ceramic material, the second layer of matrix comprising a patterned array of cavities, and filling at least a portion of the cavities of the second layer with the other of a polymer or a ceramic material to form a second composite layer.

The material used to form the inorganic material portions of each layer (e.g., portions 10A-10D) may be the same or different. Similarly, the material used to form the polymeric portions of each layer (e.g., portions 15A-15D) may be the same or different. Between each layer 5A-5D may be positioned (e.g., adjacent or on top of a composite layer), an inorganic material layer (e.g., layers 20A-20 D) which may be the same as or different from an inorganic material used to form inorganic material portions 10A-10D. Inorganic material layers 20A-20D may be, in some embodiments, a continuous inorganic material layer, i.e., it may substantially traverse across the width and/or length of the protective structure without substantial discontinuities (e.g., gaps, holes, pores) in the layer. In certain embodiments, inorganic material layers 20A-20D may be conductive to ions (e.g., lithium ions) of the electroactive material used in the corresponding electrode.

As shown in the embodiment illustrated in FIG. 3, protective structure 17 may include polymeric portions 15 that are at least partially, or in some embodiments substantially or completely, surrounded by inorganic material portions 10, as well as inorganic material portions 10 that are at least partially, or in some embodiments substantially or completely, surrounded by polymeric portions 15. Together, the composite structure may be substantially impervious to components that adversely affect the electroactive layer, thereby protecting the electroactive layer from such components (e.g., species in an electrolyte solvent, or the electrolyte solvent itself). Additionally, each layer 5A-5D may be substantially impervious to such components. That is, each layer 5A-5D, as well as intervening layers 20A-20D, may be designed to have an absence of cavities, gaps, holes, pores, or other areas in which adverse components can reside (other than defects such as cracks that may result from handling and/or use of the protective structure). For instance, each layer may be substantially nonporous. Thus, a substantially filled solid (e.g., nonporous) protective structure may be fabricated. It should be appreciated though that in other embodiments, not all cavities need be filled with a solid material (e.g., a polymeric material or an inorganic material as described herein) as long as the protective structure as a whole is substantially impervious.

Also shown illustratively in FIG. 3, article 16 also includes a substrate 30 on surface 32 of which protective structure 17 is positioned. In certain embodiments, the substrate may be a polymer gel layer. In some such embodiments, and electroactive layer may be positioned on a side opposite the polymer gel layer, e.g., against surface 35 of the protective structure. In other embodiments, substrate 30 may be an electroactive layer as described herein. For example, substrate 30 may be a lithium metal layer, which may optionally be positioned on a substrate as described herein. In yet other embodiments, substrate 30 may be another protective structure or layer (e.g., an inorganic material layer or polymer layer), which may be substantially impervious to a liquid electrolyte to be used with the cell in which the protective structure is incorporated. In other instances, substrate 30 is a carrier substrate that is removed prior to inserting the protective structure into an electrochemical cell. In some such embodiments, the layer or surface directly adjacent substrate 30 may have a relatively low adhesive affinity to substrate 30 so as to facilitate release of the protective structure from the substrate. An intervening release layer may be present between the protective structure and the substrate in some embodiments. Other configurations are also possible. The protective structure may include a first side facing a base layer of the electrode comprising an active electrode species and a second size arranged to face an electrolyte.

FIGS. 1-3 indicate the form of the inorganic material (e.g., ceramic) and polymer elements that may be possible in certain embodiments of protective structures described herein. Such structures, the inherent strengths of the polymer and inorganic materials (e.g., ceramic materials) may be accentuated while their weaknesses may be minimized. Unlike certain previously-described flat sheet protected electrodes where one individual layer, be it either inorganic material (e.g., ceramic) or polymer, is built upon the previous layer, the protective structures described herein may include at least one layer having a material embedded in another to form a composite structure.

The starting point for the protective structures described herein may be a polymer matrix, such as a non-ionically conductive and/or non-electronically conductive polymer matrix, although conductive polymer matrices (e.g., ionically conductive polymer matrices) can also be used. An ordered structure, such as a square grid arrangement is shown for explanatory purposes, but other ordered matrices, such as a honey-comb or diamond pattern, may be used as well. In other embodiments, disordered structures/arrangements may be used. In some embodiments, the walls of the polymer structure are set to a predetermined thickness, while the hollow central portions of the grid are filled with an inorganic material (e.g., an ionically conductive inorganic material such as a ceramic). Examples of such materials include $Li_2O$, $Li_3N$, sulfide glass, or another suitable ionic conductor, as well as those described in more detail below.

It should be appreciated that in other embodiments, the starting point may be an inorganic material/ceramic matrix. In some embodiments, the walls of the inorganic material/ceramic matrix are set to a predetermined thickness, and then the cavities between the inorganic material/ceramic portions are filled with a polymeric material.

By examining FIGS. 1-3, one can see that ionic paths exist from the top of the structure to the bottom of the structure through a series of columns. For instance, as shown illustratively in FIG. 3, since a flat sheet or layer 20A-20D of inorganic material (e.g., ionically conductive inorganic material such as a ceramic) is positioned at the top of each composite layer 5A-5D, and forms the base of the next layer, all the inorganic material (e.g., ceramic) columns 40 are interconnected, resulting in numerous ionic paths from top to bottom (e.g., from surface 35 to 32) and vice-versa. This in turn implies that if a defect of crack exists in any column, or in any portion of one of the inter-connecting inorganic material (e.g., ceramic) layers or sheets, that numerous other conductive paths still exist to allow for ion transfer. Unlike the case in the certain existing protective structures comprising alternating layers of ceramic and polymer, where a single crack or defect in a ceramic layer may compromise the function of that layer (e.g., by allowing the crack or defect to propagate across the layer), in the protective structures described herein, the loss of a few segments due to cracks or defects will not seriously compromise that layer because numerous other current paths exists for ions looking to move to the next layer.

This approach is similar to that used with segmented film capacitors, where the total capacitance is the sum of smaller capacitors connected in parallel. If one segment is lost there is little effect on the overall function of the aggregate capacitor. Additionally, unlike certain existing protective structures, the protective structures described herein do not necessarily require an ionically conductive polymer layer (e.g., an ionically conductive polymer), and hence, in such embodiments, is not troubled by the low conductivity problems and swellability issues that may be associated with some of these materials. Instead, a non-ionically conductive polymer can be employed in some embodiments, allowing for a larger number of choices, and increased flexibility for the inorganic material (e.g., ceramic) columns encased within each layer. As described herein, however, ionically conductive polymer materials can be used in place of, or in addition to, non-ionically conductive polymer materials in some embodiments.

Mechanically, the protective structures described herein may offer a number of benefits over certain existing protective structures. For instance, instead of discrete inorganic material (e.g., ceramic) layers made up of large flat sheets (separated by intervening polymer layers also in the form of flat sheets), which are susceptible to mechanical damage either through handling or flexing under lithium plating and stripping operations, the smaller sections of inorganic material (e.g., ceramic) may be cushioned via a surrounding polymer network. In other words, the presence of embedded polymeric material portions between sections of inorganic material portions can limit the propagation of any cracks are defects in the inorganic material portions, thereby isolating such cracks are defects to certain regions of the inorganic material. The situation is akin to how large glass telescope mirrors are constructed; smaller sections of glass connected together by a honeycomb support network, instead of one large sheet of glass which is prone to cracking when subject to flexing.

In another embodiment of a protective structure described herein, the polymer matrix is purposely graded such that more and/or smaller inorganic material (e.g., ceramic) segments (e.g., inorganic material portions having a relatively smaller cross-sectional dimension) are located towards the edges of the structure/composite layer (e.g., the left and right-hand sides of the structures shown in FIGS. 1 and 3), compared to those portions located towards the center of the structure. In such embodiments, a gradient in the size of inorganic material portions may be present across at least a portion of the width of the structure/composite layer. Such an arrangement may lead to a higher polymer density and/or higher volume of polymer at the edges compared to the center of the structure/composite layer, but this in turn gives the structure more flexibility at the edges where the sheer forces are expected to be the greatest during plating and stripping operations.

It should be pointed out that the sum of the surface areas presented by the portions of inorganic material (e.g., columns) at surface 32, i.e., at an interface between the protective structure and substrate 30 in FIG. 3 (e.g., a gel-column interface), $\beta n^2$, where $\beta$ is the total number of inorganic material portions (e.g., columns) in contact with the substrate, will approach the surface area of a flat inorganic material (e.g., ceramic) sheet as the number of inorganic material portions/columns is increased. Hence, basic functionality is preserved while mitigating basic flat sheet failure issues.

In some embodiments, the average width (or cross-sectional dimension) of the inorganic material portions of a composite layer of a protective structure is at least 1 time, at least 1.2 times, at least 1.5 times, at least 2 times, at least 3 times, at least 5 times, at least 7 times, at least 10 times, at least 15 times, at least 20 times, at least 30 times, at least 40 times, at least 50 times, at least 75 time, or at least 100 times the average width (or cross-sectional dimension) of the polymeric portions of the same layer. In certain embodiments, the average width (or cross-sectional dimension) of the inorganic material portions of the composition layer may be less than or equal to 200 times, less than or equal to 150 times, less than or equal to 100 times, less than or equal to 80 times, less than or equal to 50 times, less than or equal to 30 times, less than or equal to 20 times, or less than or equal to 10 times the average width (or cross-sectional dimension) of the polymeric portions of the same layer. Combinations of the above referenced ranges are also possible.

Just as importantly, the articles and methods described herein may allow for scalability. Consider the construction and handling issues associated with constructing a 1M×1M inorganic material (e.g., ceramic) sheet. The error margin involved in such operations is greatly reduced over making 2M×2M sheets; to the point that serious questions arise as to the feasibility of such an approach. With the articles and methods described herein, these conditions are greatly relaxed, given that the smaller sizes of inorganic material portions (e.g., columns) may be the primary point of concern. The flat inter-connecting sheets/layers of inorganic material (e.g., layers 20A-20D), if present, are free to have cracks and defects in them given the total number of inorganic material portions (e.g., columns) available for conduction.

Figure 4:
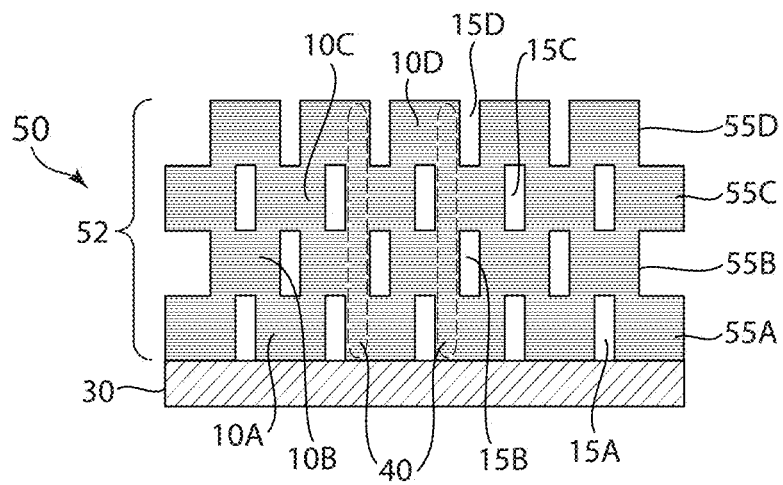
FIG. 4 is an illustrative embodiment showing another article including a protective structure having multiple layers according to one set of embodiments.

In another embodiment of the above approach, the flat inter-connecting sheets/layers of inorganic material (e.g., layers 20A-20D) may be removed from the protective structure. Although doing so may lead to a more difficult realization of the protective structure in terms of construction, it has mechanical benefits. An example of such a structure is shown in FIG. 4. Note that in this case the polymer portions should be registered correctly as the layers are built one upon another. In this instance the columns may end up being staggered during construction such that the layer above the first one is re-centered to make contact with the columns below it (hence creating the different possible conduction paths). As shown illustratively in FIG. 4, multiple columns 40 of inorganic material may be present in the protective structure.

As described herein, the disclosed protective structures may correct some layer by layer limitations encountered with certain existing layered protective structure configurations by accentuating the strengths of the materials involved: flexibility, multiple ionic paths for the inorganic material (e.g., ceramic) to handle cracks and defects, and in some instances, no need for ion conduction within the polymer. The enhanced flexibility of this structure should also prove beneficial in terms of handling properties, especially if de-lamination from a substrate is still required or desired.

The structures described herein also have numerous applications outside of the battery field. The ability to make a flexible inorganic material (e.g., ceramic) structures leads to military applications in terms of IR deception and radar deception with the correct selection of materials. The flexibility component of the proposed structure in turn, leads to the possible inclusion of such a structure in tents, tarps, and even clothing. It may well be possible to cover objects like unmanned aerial vehicles (UAVs) or ground droids with sections of this material, or it may be possible to apply the materials to cover portions of larger vehicles to enhance or reduce their radar/IR signature. It may even be possible to make active, adaptive camouflage patterns. No doubt numerous other potential applications exist as well.

There are multiple paths to the physical realization of the above approach, examples of which are described in more detail below.

Generally, methods described herein may involve forming a base layer comprising an active electrode species attached to a protective structure. The protective structure may be formed by positioning on a substrate at least one layer of a matrix comprising a polymer or a ceramic material, the matrix comprising a patterned array of cavities, and filling at least a portion of the cavities with the other of a polymer or a ceramic material to form a composite layer. The composite layer may have an average ionic conductivity of at least $10^{-7}$ S/cm.

In such embodiments, the substrate may be the base layer (e.g., lithium metal), i.e., the protective structure may be formed on the electroactive layer. In other embodiments, the substrate may be a carrier substrate. In such embodiments, a base layer comprising an active electrode species may be formed on top of the protective structure. Other substrates are also possible as described herein.

In some embodiments, a second composite layer may be formed on the at least one layer of matrix, or on an intervening layer. The second composite layer may include a second layer of a matrix comprising a polymer or a ceramic material, the second layer of matrix comprising a patterned array of cavities, and filling at least a portion of the cavities of the second layer with the other of a polymer or a ceramic material to form the second composite layer. In such embodiments, the second layer may be positioned direction on the first composite layer, or an intervening layer such as a continuous ceramic material layer may be positioned between the first and second composite layers.

The first element to consider are the polymeric portions (i.e., polymer matrix). There are several ways to deposit this matrix. The first would be to deposit (e.g., flash deposit, coat, or apply in any other suitable manner) a layer of polymer of the desired thickness. This material may then be passed in front of a screen or mask. A polymer processing station (e.g., a curing, drying, or crosslinking station such as a UV lamp, oven, or other suitable apparatus) may be located behind this screen/mask allowing for the curing, drying and/or crosslinking of just the desired polymer pattern. The remaining uncured/undried/uncrosslinked polymer material, after passing by the mask and polymer processing station, can be removed. For example, any uncured material may evaporate in the vacuum environment, a process that can be accelerated by the use of heat lamps. Another approach to the construction of the polymer matrix involves a printing technique. Any suitable printing technique may use; for example, a print roller where a viscous polymeric material is transferred through a gravure roller either using a liquid reservoir or via injection into the roller through a pump. In this case the pattern is laid directly on the chosen substrate and cured/dried/crosslinked at a polymer processing station (e.g., via e-beam, UV, thermal, or chemical methods). Another option is to directly print the polymer matrix through more conventional ink-jet or nozzle type arrangements with curing, drying and/or crosslinking taking place using one of the previously described, or other suitable forms. This last method may be better suited to atmospheric situations.

The second element to consider is inorganic material (e.g., ceramic) deposition. These methods are well understood and include, for example, e-beam evaporation, sputtering, and thermal evaporation, among others. An issue arises at this step in terms of the actual inorganic material (e.g., ceramic) coating and the polymer matrix. This issue is shown illustratively in FIG. 5.

Figure 5:
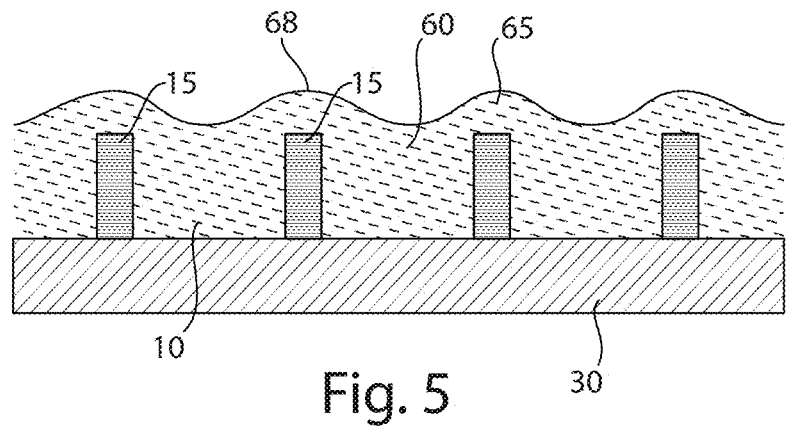
FIG. 5 is an illustrative embodiment showing the deposition of an inorganic material filling regions between polymer portions according to one set of embodiments.

As shown in the embodiment illustrated in FIG. 5, areas where polymer portions 15 are not present (e.g., hollow portions of the polymer matrix) may be filled with an inorganic material (e.g., ceramic) 60. During filling, a "flat" interconnecting plate 65 may be created as desired in one embodiment of the structure, but questions arise as to the peaks 68 formed by the inorganic material (e.g., ceramic) coating over the polymer walls after a few layers.

It is not clear that these peaks will pose a major issue given that a role of the polymer matrix is simply to add flexibility to the inorganic material (e.g., ceramic). Under these circumstances the desired inorganic material (e.g., ceramic) paths will still exist, and the supporting polymer structure will still perform its required role. Should it be desired, methods may be employed to deal with the surface variations arising from the inorganic material (e.g., ceramic) coating over the polymer matrix.

Figure 6A:
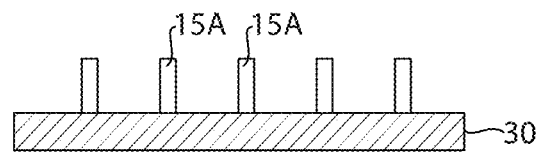
FIGS. 6A-6E show a process for forming a protective structure according to one set of embodiments.
Figure 6B:
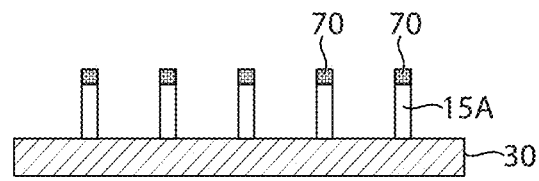
Figure 6C:
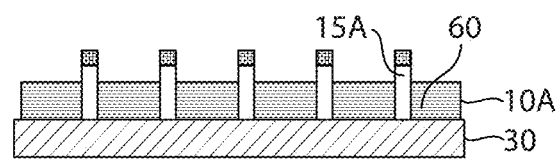
Figure 6D:
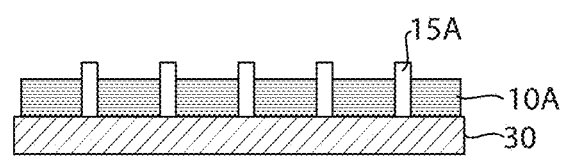
Figure 6E:
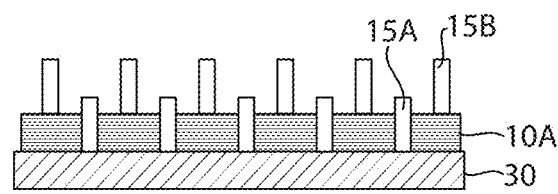

One approach may be to use a coating system or oil system, e.g., via a synchronized mask or a contact roller, to place a thin coating of oil or liquid over the raised portions of the cured, dried or crosslinked polymer mask. This sequence of events is shown in FIG. 6. As shown illustratively in FIGS. 6A-6E, polymeric portions 15A may be deposited in a desired pattern (FIG. 6A). A thin coating 70 of oil, liquid, or any other suitable material for inhibiting adhesion of the inorganic material to the polymeric material, may be placed over the polymeric portions (FIG. 6B). Inorganic material (e.g., ceramic) 60 will not deposit to this coating, and instead may be deposited in between the polymeric portions to form inorganic material portions 10A (FIG. 6C). Coatings 70 may then be removed, e.g., via a light plasma treatment, as shown in FIG. 6D. Plasma treatment may be performed in the presence of various gases such as: air, oxygen, ozone, carbon dioxide, carbonyl sulfide, sulfur dioxide, nitrous oxide, nitric oxide, nitrogen dioxide, nitrogen, ammonia, hydrogen, freons (e.g., CF4, CF2Cl2, $CF_3Cl$), silanes (e.g., $SiH_4$, $SiH_2(CH_3)_2$, $SiH_3CH_3$), and/or argon. This same plasma treatment may also have the beneficial effect of promoting adhesion between inorganic material (e.g., ceramic) layers, such as adhesion between the top surfaces of inorganic material portions 10A with subsequent inorganic material portions to be deposited on top (not shown). Additional polymeric portions 15B may then be deposited in a desired pattern on top of inorganic material portions 10A (FIG. 6E). This process can be repeated until the desired number of composite layers is fabricated.

Figure 7A:
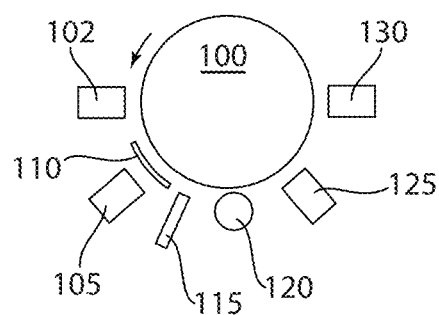
FIGS. 7A and 7B show different methods for forming layers of a protective structure according to one set of embodiments.
Figure 7B:
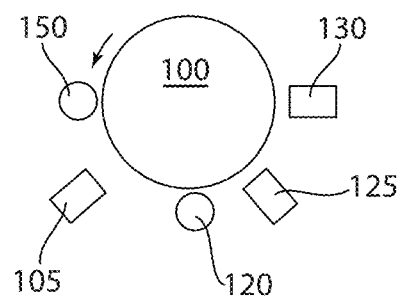

Two possible systems for fabricating the structures described in FIG. 6, and the equipment required to implement these methods in a vacuum environment, are shown illustratively in FIGS. 7A and 7B.

In FIG. 7A, the approach involves use of a rotating drum 100. A sheet of polymer may be laid down via a polymer deposition process (e.g., flash deposition process). The desired pattern in this sheet is obtained by using a polymer processing unit 105 (e.g., a curing station that would UV-cure the polymer) through a physical mask 110. The uncured polymer, which is the central areas of the pattern, is then driven off by a heat lamp 115. It should be pointed out that this uncured polymer would eventually evaporate in the vacuum environment, but to accelerate this process a heat lamp may optionally be employed. In other embodiments, the polymer can be dried and/or crosslinked in addition to or alternatively to being cured at the polymer processing unit. The next step involves a coating of oil, liquid, or other anti-adhesion material mask. A mask applicator 120, such as a roller, be it patterned or not, is responsible for coating the top portions of the cured, dried and/or crosslinked polymer pattern with this material so that inorganic material (e.g., ceramic) will not deposit in these areas. The next step an inorganic material deposition process 125 (e.g., an e-beam or sputtering system) which will deposit the inorganic material (e.g., ceramic) into the hollow portions of the pattern. Lastly, a plasma treatment 130 may be employed to remove the oil/liquid/anti-adhesion material mask and increase the surface energy of the current inorganic material (e.g., ceramic) layer in anticipation of the next polymer/inorganic material (e.g., ceramic) layer.

FIG. 7B is a variation on the previous scheme. In this embodiment a printing unit 150 is used to print the polymer pattern is onto a substrate and cured, dried and/or crosslinked using polymer processing unit 105. This approach dispenses with the heat lamp to drive off the undesired portions of the polymer coating. The rest of the system is as described previously.

In embodiments in which an inorganic material/ceramic matrix is deposited first, a masking system can be used to include a coating on the inorganic material/ceramic portions so that the cavities between the inorganic material/ceramic portions are filled with a polymeric material, but the polymeric material does not adhere to the inorganic material/ceramic portions.

Another fabrication process involves printing the inorganic material (e.g., ceramic)/polymer portion of the composite structure. Consider a three dimensional polymer matrix printed via screen printing or masking approaches outside of a vacuum environment. The hollow portions of such a matrix could then be filled with inorganic material (e.g., ceramic) powders, or an inorganic material (e.g., ceramic) slurry, and if the polymer material is chosen correctly for temperature, then fired to sinter the contained inorganic materials (e.g., ceramics). Inorganic materials such as halides and oxy-sulfides (e.g., lithium oxy-sulfides) may be good choices for this approach as both require low temperatures for sintering. One issue to consider in such an effort is the thickness of the inorganic material (e.g., ceramic) layers deposited. In some embodiments, a reduction in powder grain size may be required. Even so, this method of manufacturing, which may involve vacuum deposition for only the final lithium deposition step, may offer major economic advantages over the all vacuum approach.

It should be appreciated that while FIGS. 1-6 show various configurations of protected structures, in some embodiments not all components shown in the figure need be present. It should also be appreciated that other components that are not shown in the figures may be included in the protective structures in some embodiments. For example, in place of or in addition to inorganic material layers 20A-20D, one or more ion-conductive polymer layers may be present in some embodiments. Additionally, other components not shown in the figures may be present in certain articles described herein (e.g., an electroactive layer may be positioned on one side of the protective structure in addition to a polymer gel layer positioned on the other side of the protective structure). Other configurations are also possible.

In a specific embodiment of the invention, a protected electrode may be an anode in a lithium battery. Lithium battery systems generally include a cathode which is electrochemically lithiated during the discharge. In this process, lithium metal is converted to lithium ion and transported through the electrolyte to the battery's cathode, where it is reduced. In a lithium/sulfur battery, for example, lithium ion forms one of a variety of lithium sulfur compounds at the cathode. Upon charging, the process is reversed, and lithium metal is plated, from lithium ion in the electrolyte, at the anode. In each discharge cycle, a significant amount (e.g., up to 100%) of available Li may be electrochemically dissolved in the electrolyte, and nearly this amount can be re-plated at the anode upon charge.

This process can be stressful to the electrode in many ways, and it can lead to premature depletion of Li and reduction of the battery cycle life. One means of protecting an electrode is by having a ceramic layer that serves as an electronic insulator, acting as an electrolyte barrier. In certain prior art structures, the ceramic layers were sometimes treated with a polymer to fill in defects. However, such treatments could, in some instances, impede diffusion of certain species towards the electrode and reduce ionic conductivity.

As described herein, an electrode may include a protective structure that can be used to prevent or inhibit reaction of an electroactive layer with other components to be used with the electrode. Examples of such reactive components include electrolytes (e.g., solvents and salts) and cathode discharge products. In some embodiments, the protective structure comprises at least a first and second composite layer, each layer comprising a polymer matrix having a plurality of cavities and an inorganic material filling at least two cavities. Each inorganic material-filled cavity may be in ionic communication with the base layer. Each inorganic material-filled cavity may be in ionic communication with both sides of the protective structure (i.e., the base layer comprising an active electrode species and the electrolyte). Advantageously, the structure can provide a plurality of ionic pathways from one side of the protective structure to the other side. This is an advantage because inorganic material such as ceramics may have defects that lead to crack nucleation and propagation. As the area of the ceramic increases, the number of defects encountered increases proportionally. If a continuous layer of ceramic material is used to protect an electrode, a crack may lead to failure of the ceramic layer. If, however, a plurality of inorganic material-filled cavities are arranged in a polymer matrix and provide a plurality of ionic pathways from one side of the protective structure to the other, the effect of a defect in any one pathway is minimized. Additionally, the smaller inorganic material/ceramic cells cushioned by a polymer matrix may be less susceptible to cracking during flexing than a continuous inorganic material/ceramic layer.

In some embodiments, the average ionic conductivity of the protective structure is at least about $10^{-7}$ S/cm, at least about $10^{-6}$ S/cm, at least about $10^{-5}$ S/cm, at least about $10^{-4}$ S/cm, at least about $10^{-2}$ S/cm, at least about $10^{-1}$ S/cm, at least about 1 S/cm, at least about $10^1$ S/cm, at least about $10^2$ S/cm, at least about $10^3$ S/cm, at least about $10^4$ S/cm, or at least about $10^5$ S/cm. In some instance, the average ionic conductivity of the protective structure may be less than or equal to about $10^5$ S/cm, less than or equal to about $10^4$ S/cm, less than or equal to about $10^3$ S/cm, less than or equal to about $10^2$ S/cm, or less than or equal to about $10^1$ S/cm. Combinations of the above referenced ranges are also possible.

The average ionic conductivity of the protective structures described herein may be, in some embodiments, higher than the average ionic conductivity of protective structures in the prior art. For example, in certain embodiments in which a non-ionically conductive polymer is used in the protective structure, the ions are not required to pass through the polymer to reach the electrode (or electrolyte). The ions pass through the ionically conductive inorganic material (e.g., ceramic) portions, which may generally have a higher ion conductivity than any ionically conductive polymer portions that may be used. This feature, in which inorganic material-filled cavities provide a plurality of ionic pathways from one side of the protective structure to the other and ions are not required to travel through a polymer, allows the protective structure to gain mechanical advantages from the presence of the polymer without suffering disadvantages relating to reduced ion conductivity.

In some embodiments, the protective structure comprises at least a first and second composite layer. Any suitable number of compasses layers can be included in the protective structure. For example, in some embodiments, the protective structure further comprises at least a third composite layer, at least a fourth composite layer, at least a fifth composite layer, at least a sixth composite layer, at least a seventh composite layer, at least an eighth composite layer, at least a ninth composite layer, or at least a tenth composite layer. Additional numbers of layers are also possible.

As described herein, a protective structure may include at least one layer comprising a patterned array of cavities within a matrix, wherein a polymer or a ceramic material forms the matrix, and the other of the polymer or ceramic material fills at least a portion (or all) of the cavities. A patterned array of cavities may be distinguished from a random arrangement of cavities by the presence of repeating units (e.g., cavities distanced at predetermined, or regular intervals from one another).

The cavities of a matrix material such as polymer or an inorganic material/ceramic (and the shapes of any material filling such cavities) may have any shape. As non-limiting examples, the cavities (and the shapes of any material filling such cavities) may have cross sections that are substantially square, rectangular, pentagonal, hexagonal, octagonal, or circular. In some embodiments, all the cavities in a given composite layer may have the same shape. In other embodiments, at least one cavity in a given composite layer has a different shape from at least one cavity in the layer. In some cases, the cavities in a composite layer in a protective structure may be the same size. In some cases, the cavities may be different sizes. Cavities may be filled or unfilled with material (e.g., inorganic materials such as ceramics, polymeric material) as described herein.

It should be appreciated that while in many embodiments inorganic material-filled cavities are described with respect to a polymer matrix, in other embodiments a structure may include polymer-filled cavities with respect to an inorganic material/ceramic matrix. Thus, the description herein for cavities of a polymer matrix may apply to cavities of an inorganic material/ceramic.

In some embodiments, the average largest cross-sectional dimensions of cavities (e.g., within a layer or within an entire protective structure) may be, for example, less than or equal to 10 microns, less than or equal to 5 microns, less than or equal to 2 microns, less than or equal to 1 micron, less than or equal to 500 nm, less than or equal to 300 nm, less than or equal to 100 nm, or less than or equal to 50 nm, less than or equal to 10 nm. In some embodiments, the average largest cross-sectional dimensions of cavities may be greater than or equal to 5 nm, greater than or equal to 10 nm, greater than or equal to 50 nm, greater than or equal to 100 nm, greater than or equal to 300 nm, greater than or equal to 500 nm, or greater than or equal to 1 micron. Other sizes are also possible. Combinations of the above-noted ranges are also possible (e.g., a largest cross-sectional dimension of less than 300 nm and greater than 100 nm). The average largest cross-sectional dimensions of the material (e.g., inorganic material portions, or polymeric portions) that fill the cavities may also include values in the above referenced ranges.

In some cases, the maximum percentage difference between the largest cross-sectional dimensions of the cavities (e.g., in a layer, or in a protective structure) may be less than 100%, less than 50%, less than 20%, less than 10%, less than 5%, or less than 1%. In some instances, the maximum percentage difference between the largest cross-sectional dimensions of the cavities (e.g., in a layer, or in a protective structure) may be at least 1%, at least 5%, at least 10%, at least 20%, at least 50%, at least 70%, or at least 100%. Combinations of the above referenced ranges are also possible. The maximum percentage difference between the largest cross-sectional dimensions of the material (e.g., inorganic material portions, or polymeric portions) that fill the cavities (e.g., in a layer, or in a protective structure) may also include values in the above referenced ranges. In certain embodiments, the cavities near the edges of the layer or protective structure may be smaller than the cavities near the center of the layer or protective structure. Such an arrangement may provide more flexibility at the edges of the structure, where shear forces may be greatest.

In some cases, each material (e.g., inorganic material, or polymeric material)-filled cavity in a composite layer may comprise the same material. In other cases, at least one material (e.g., inorganic material, or polymeric material)-filled cavity in a composite layer may comprise a different material than at least one other material-filled cavity in the same composite layer.

In some embodiments, a first composite layer in a protective structure may have the same number of cavities as at least one other composite layer in the protective structure. In some embodiments, the number of cavities in a first composite layer in a protective structure may be different from the number of cavities in at least one other composite layer in the protective structure.

In certain cases, one or more cavities in a first composite layer in a protective structure may be aligned with one or more cavities in at least one other composite layer in the protective structure. For instance, a line drawn perpendicular to the horizontal plane of the composite layers may intersect a point on or within a cavity of a the first composite layer and a point on or within a cavity in a second composite layer. Likewise, a material filling a cavity (e.g., an inorganic material/ceramic or a polymeric material) of a first composite layer may be aligned with a material filling a cavity of a second composite layer, e.g., such that a line drawn perpendicular to the horizontal plane of the composite layers may intersect a point on or within the first material (e.g., an inorganic material/ceramic or a polymeric material) and a point on or within a second material (e.g., an inorganic material/ceramic or a polymeric material) in a second composite layer. In certain embodiments, one or more cavities in a first composite layer in a protective structure are not aligned with any cavity from at least one other composite layer in the protective structure.

In some cases, the cavities of different composite layers in a protective structure may have different sizes, shapes, and/or locations. In some cases, the cavities of different composite layers in a protective structure may have the same size, shape, and/or location. In certain embodiments, inorganic material-filled cavities in different composite layers in a protective structure may comprise different inorganic materials. In certain embodiments, inorganic material-filled cavities in different composite layers in a protective structure may comprise the same inorganic material. In some cases, the polymer matrices of different composite layers in a protective structure may comprise different polymers. In some cases, the polymer matrices of different composite layers in a protective structure may comprise the same polymer. The inorganic material (e.g., ceramic)-to-polymer mass ratio and/or volume ratio may be the same in different composite layers in a protective structure. The inorganic material (e.g., ceramic)-to-polymer mass ratio and/or volume ratio may be different in different composite layers in a protective structure. In some embodiments, different composite layers in a protective structure may have different thicknesses. In some embodiments, different composite layers in a protective structure may have the same thickness.

The thickness of a composite layer comprising polymer and inorganic material may vary over a range from about 1 nm to about 10 microns. For instance, the thickness of a composite layer may be between 1-10 nm thick, between 10-100 nm thick, between 10-1000 nm thick, between 100-1000 nm thick, between 1-5 microns thick, or between 5-10 microns thick. The thickness of a composite layer may be no greater than, e.g., 10 microns thick, no greater than 5 microns thick, no greater than 1000 nm thick, no greater than 500 nm thick, no greater than 250 nm thick, no greater than 100 nm thick, no greater than 50 nm thick, no greater than 25 nm thick, or no greater than 10 nm thick. In some embodiments, each composite layer has a maximum thickness of less than 100 microns, less than 50 microns, less than 25 microns, less than 10 microns, less than 1 micron, less than 100 nm, less than 10 nm, or less than 1 nm. In some embodiments, a composite layer is at least 1 nm thick, at least 10 nm thick, at least 20 nm thick, at least 30 nm thick, at least 50 nm thick, at least 100 nm thick, at least 400 nm thick, at least 1 micron thick, at least 2.5 microns thick, or at least 5 microns thick. Other thicknesses are also possible. Combinations of the above-noted ranges are also possible. In certain embodiments, several composite layers, each having a thickness in one or more of the above-referenced ranges, are arranged in a protective structure.

In some embodiments, the thickness of the protective structure may vary from, e.g., about 2 to 200 microns. For instance, the protective structure may have a thickness of less than about 200 microns, less than about 100 microns, less than about 50 microns, less than about 25 microns, less than about 10 microns, or less than about 5 microns. The protective structure may have a thickness of at least 1 micron, at least 2 microns, at least 5 microns, at least 10 microns, at least 20 microns, or at least 50 microns. Combinations of the above referenced ranges are also possible. The choice of the thickness may depend on cell design parameters such as cycle life. In one embodiment, the thickness of the protective structure is in the range of about 2 to 100 microns. In another embodiment, the thickness of the protective structure is in the range of about 5 to 50 microns. In another embodiment, the thickness of the protective structure is in the range of about 5 to 25 microns. In yet another embodiment, the thickness of the protective structure is in the range of about 10 to 25 microns. In some particular embodiments, a protective structure may have a thickness in one or more of the above-referenced ranges for the thickness of a composite layer.

In some embodiments, the ratio of polymer to inorganic material (e.g., ceramic) content in a composite layer (or a protective structure) may be at least 1%, at least about 5%, at least about 10%, at least about 20%, at least about 30%, or at least about 40% by volume.

In some embodiments, the volume of polymer in a composite layer (or a protective structure) may be at least 1%, at least about 5%, at least about 10%, at least about 20%, at least about 30%, or at least about 40% of the total volume of material in the layer (or structure). The volume of polymer in the composite layer (or a protective structure) may be less than or equal to about 60%, less than or equal to about 50%, less than or equal to about 40%, less than or equal to about 30%, less than or equal to about 20%, or less than or equal to about 10% of the total volume of material in the layer (or structure). Combinations of the above-referenced ranges are also possible.

In certain embodiments, the ratio of polymer to inorganic material (e.g., ceramic) content in a composite layer (or a protective structure) may be at least 1%, at least about 2%, at least about 5%, at least about 10%, at least about 15%, at least about 20%, at least about 25%, or at least about 30% by weight or mass.

In some embodiments, the mass/weight of polymer in a composite layer (or a protective structure) may be at least 1%, at least about 2%, at least about 5%, at least about 10%, at least about 15%, at least about 20%, at least about 25%, at least about 30%, or at least about 40% of the total mass/weight of material in the layer (or structure). The mass/weight of polymer in the composite layer (or a protective structure) may be less than or equal to about 60%, less than or equal to about 50%, less than or equal to about 40%, less than or equal to about 30%, less than or equal to about 20%, or less than or equal to about 10% of the total mass/weight of material in the layer (or structure). Combinations of the above-referenced ranges are also possible.

In certain cases, the ratio of the sum of the surface areas of the inorganic material-filled (e.g., ceramic-filled) cavities (or inorganic material/ceramic portions) to the surface area of the electrode may be at least about 0.2, at least about 0.3, at least about 0.4, at least about 0.5, at least about 0.6, at least about 0.7, at least about 0.8, at least about 0.9, or at least about 1. The ratio of the sum of the surface areas of the inorganic material-filled (e.g., ceramic-filled) cavities (or inorganic material/ceramic portions) to the surface area of the electrode may be less than or equal to about 1, less than or equal to about 0.9, less than or equal to about 0.8, less than or equal to about 0.7, less than or equal to about 0.6, less than or equal to about 0.5, less than or equal to about 0.4, less than or equal to about 0.3, or less than or equal to about 0.2. Combinations of the above-referenced ranges are also possible. The surface areas in the above-referenced ranges may be, in some instances, the surface areas on an outer surface of the protective structure (e.g., the surface area exposed to an electrolyte such as a liquid electrolyte).

Certain embodiments relate to methods of fabricating a protective structure including a polymer layer (which may be continuous or discontinuous). As described herein, in some embodiments, the polymer layer includes regions of polymer that are interconnected with one another within the layer, while in other embodiments the regions are isolated from one another within the layer (e.g., an inorganic material/ceramic may separate the polymeric regions from one another in the layer). In some embodiments, a polymer layer may be deposited by a method such as electron beam evaporation, vacuum thermal evaporation, laser ablation, chemical vapor deposition, thermal evaporation, plasma assisted chemical vacuum deposition, laser enhanced chemical vapor deposition, jet vapor deposition, and extrusion. The polymer layer may also be deposited by spin-coating techniques. The technique used for depositing the polymer layer may depend on the type of material being deposited, the thickness of the layer, etc.

In some embodiments, the deposited polymer layer may pass in front of a screen or a mask. The screen or mask may be patterned. There may then be a curing, drying and/or crosslinking step. A curing or crosslinking step may, in some cases, allow for curing of only a desired polymer pattern. The curing or crosslinking step may include photo-initiated techniques, such as ultraviolet (UV) curing/crosslinking, plasma treatment, and/or electron beam curing/crosslinking. In some embodiments, the polymer masking and/or curing/crosslinking/drying steps may be conducted under vacuum. Crosslinking steps may involve the use of photoinitiators.

In some embodiments, the bulk, shear, and/or Young's modulus of a composite structure comprising material-filled cavities in a matrix (e.g., inorganic material-filled cavities in a polymer matrix, or vice versa) may be less than an analogous modulus of a comparative composite structure comprising a first layer of the inorganic material and a second layer of the polymer. For example, a first composite comprising inorganic material-filled cavities in a polymer matrix may have an overall thickness, a total amount of inorganic material, and a total amount of polymer. A second, comparative composite comprising a first layer of the inorganic material and a second layer of the polymer may have the same overall thickness, the same total amount of inorganic material, and the same total amount of polymer. The first composite may have a bulk, shear, and/or Young's modulus that is less (e.g., by at least a factor of about 2, at least a factor of about 10, at least a factor of about 20, at least a factor of about 50, or at least a factor of about 100, in some embodiments up to a factor of 1000, or up to a factor of 500) than the analogous modulus for the second, comparative composite. A bulk, shear, and/or Young's modulus for the first composite that is lower than the analogous modulus for the second composite may indicate that the first composite is more flexible and/or deformable than the second composite. The bulk, shear, and/or Young's modulus may be determined for each composite according to any method known in the art. For example, the international standard ISO 14577-4:2007 (E) test method (test method for metallic and non-metallic coatings) may be used to determine the Young's modulus of each of the first and second composites.

In some embodiments, the bulk, shear, and/or Young's modulus of at least one polymer in the polymer matrix of a composite layer may be less than the analogous modulus of at least one inorganic material (e.g., ceramic material) in the layer (e.g., filling at least one cavity in the polymer matrix) by at least a factor of about 2, at least a factor of about 10, at least a factor of about 20, at least a factor of about 50, or at least a factor of about 100, in some embodiments up to a factor of 1000, or up to a factor of 500. A lower polymer modulus compared to the inorganic material (e.g., ceramic) modulus may result in a composite layer that is more robust and/or more flexible than the inorganic material (e.g., ceramic) alone. The international standard ISO 14577-4:2007 (E) test method (test method for metallic and non-metallic coatings) may be used.

In some embodiments, the fracture strain of a composite structure comprising material-filled cavities in a matrix (e.g., inorganic material-filled cavities in a polymer matrix, or vice versa) may be larger than the fracture strain of a composite structure comprising a first layer of the inorganic material and a second layer of the polymer. For example, a first composite comprising inorganic material-filled cavities in a polymer matrix may have an overall thickness, a total amount of inorganic material, and a total amount of polymer. A second composite comprising a first layer of the inorganic material and a second layer of the polymer may have the same overall thickness, the same total amount of inorganic material, and the same total amount of polymer. The first composite may have a fracture strain larger than the fracture strain of the second composite, e.g., by at least a factor of about 2, at least a factor of about 10, at least a factor of about 20, at least a factor of about 50, or at least a factor of about 100, in some embodiments up to a factor of 1000, or up to a factor of 500. A fracture strain for the first composite that is larger than the fracture strain for the second composite may indicate that the first composite is able to withstand more strain prior to fracture than the second composite. The fracture strain may be determined for each composite according to any method known in the art. For example, the standard ASTM E2546-07 may be used.

In some embodiments, the fracture strain of at least one polymer in the polymer matrix may be larger than the fracture strain of at least one inorganic material (e.g., ceramic material) in the layer (e.g., filling at least one cavity in the polymer matrix) by at least a factor of about 2, at least a factor of about 10, at least a factor of about 20, at least a factor of about 50, or at least a factor of about 100, in some embodiments up to a factor of 1000, or up to a factor of 500. A higher polymer fracture strain compared to the inorganic material (e.g., ceramic) fracture strain may result in a composite layer that is able to withstand more strain prior to fracture than the inorganic material (e.g., ceramic) alone. In some embodiments, the standard ASTM E2546-07 may be used.

In some embodiments, the critical radius of curvature of a composite structure comprising material-filled cavities in a matrix (e.g., inorganic material-filled cavities in a polymer matrix, or vice versa) may be larger than the critical radius of curvature of a composite structure comprising a first layer of the inorganic material and a second layer of the polymer. For example, a first composite structure comprising material-filled cavities in a matrix (e.g., inorganic material-filled cavities in a polymer matrix, or vice versa) may have an overall thickness, a total amount of inorganic material, and a total amount of polymer. A second, comparative composite comprising a first layer of the inorganic material and a second layer of the polymer may have the same overall thickness, the same total amount of inorganic material, and the same total amount of polymer. The first composite may have a critical radius of curvature larger than the critical radius of curvature of the second composite, e.g., by at least a factor of about 2, at least a factor of about 10, at least a factor of about 20, at least a factor of about 50, or at least a factor of about 100, in some embodiments up to a factor of 1000, or up to a factor of 500. A critical radius of curvature for the first composite that is larger than the critical radius of curvature for the second composite may indicate that the first composite is more flexible than the second composite. The critical radius of curvature may be determined for each composite according to any method known in the art. For example, the critical radius of curvature may be determined using a bending test. Such a test may involve obtaining a sample (e.g. a sample having dimensions of 5 cm×2.5 cm). The geometric center of the sample is determined by optical profilometry. The edges of the sample are moved together, causing the sample to be bent into the shape of an arc. For example, for a sample having a length of 5 cm, the edges of the sample may be moved to distances ranging from about 4.5 cm (e.g., a slight change, or relatively small radius of curvature) to about 2.5 cm (e.g., a severe change, or relatively large radius of curvature). At different distances, the radius of curvature of the sample may be measured, and the presence or absence of fractures may be determined by optical profilometry at the geometric center. The critical radius of curvature is the minimum radius of curvature at which fracture begins to take place at the geometric center of the sample.

In certain embodiments, the critical radius of curvature of at least one polymer in the polymer matrix is less than the critical radius of curvature of at least one inorganic material (e.g., ceramic material) filling at least one cavity in the polymer matrix by a factor of about 2, about 10, about 20, about 50, or about 100. The critical radius of curvature may be determined using a bending test, e.g., as described above.

The polymer layer or polymeric portions within a composite layer can be configured to be substantially electronically non-conductive, in certain embodiments, which can inhibit the degree to which the polymer layer causes short circuiting of the electrochemical cell. In certain embodiments, all or part of the polymer portions can be formed of a material with a bulk electronic resistivity of at least about $10^4$, at least about $10^5$, at least about $10^{10}$, at least about $10^{15}$, or at least about $10^{20}$ Ohm-meters. The bulk resistivity may be, for example, less than about $10^{50}$ Ohm-meters, less than about $10^{40}$ Ohm-meters, or less than about $10^{20}$ Ohm-meters. In other embodiments, electronically conductive polymers can be used. Combinations of the above-referenced ranges are also possible. In some embodiments, the polymer may consist essentially of one or more polymers. The polymer may, in some embodiments, be a monomer, a mixture of copolymers, block copolymers, or a combination of two or more polymers that are in an interpenetrating network or semi-interpenetrating network. In alternative embodiments, the polymer may comprise a filler and/or solid additive. The filler and/or solid additive may add strength, flexibility, and/or improved adhesion properties to the polymer. In some embodiments, the polymer may comprise a plasticizer or other additives, including solid phase change materials. Addition of plasticizers may increase flexibility of the polymer and improve thixotropic properties. Addition of solid phase change materials may result in addition of materials that melt at elevated temperatures and thereby act as a heat sink and prevent thermal runaway.

In some embodiments, the polymer may be selected to be flexible. Nano-hardness studies may be conducted to measure creep and/or hardness and thereby assess the flexibility and/or brittleness of a polymer. In certain cases, the polymer may be selected to be thermally stable above 200° C., 250° C., 300° C., 350° C., or 400° C. Thermal stability may be assessed by differential scanning calorimetry (DSC). Non-limiting examples of polymers that may exhibit thermal stability at elevated temperatures include polysiloxanes, polycyanurates, and polyisocyanurates.

In some embodiments, the polymer may be selected to exhibit good adhesion to the inorganic material (e.g., ceramic, glass, or glassy-ceramic material). Adhesion may be assessed by a peel force test. In certain embodiments, to determine relative adhesion strength between two materials (e.g., two layers of materials), a tape test can be performed. Briefly, the tape test utilizes pressure-sensitive tape to qualitatively asses the adhesion between a first layer (e.g., a polymer layer) and a second layer (e.g., an inorganic material layer). In such a test, an X-cut can be made through the first layer (e.g., polymer layer) to the second layer (e.g., an inorganic material layer). Pressure-sensitive tape can be applied over the cut area and removed. If the polymer layer stays on the inorganic material layer, adhesion is good. If the polymer layer comes off with the strip of tape, adhesion is poor. The tape test may be performed according to the standard ASTM D3359-02. In some embodiments, a strength of adhesion between the polymeric material and the inorganic material passes the tape test according to the standard ASTM D3359-02, meaning the inorganic material does not delaminate from the polymer material (or vice versa) during the test.

Examples of polymers that may offer good adhesion to inorganic materials/ceramics include, but are not limited to, polysiloxanes, which may provide flexibility and strength. The polymer may, in certain cases, be selected to be inert to the electrolyte solution and/or Li polysulfide attack. A means of determining the stability of a polymer in an electrolyte solution includes exposing a small sample of the polymer to vapors of an electrolyte solvent. Examples of polymers that may be stable in an electrolyte solution include, but are not limited to, polyurethanes and polysiloxanes. Additional tests that may be conducted on polymers to examine various characteristics include Fourier transform infrared spectroscopy (FTIR) to confirm that a polymer is cured or cross-linked, scanning electron microscopy with energy dispersive x-ray spectroscopy (SEM-EDS) to determine whether a polymer has cracks. Such test and other tests can also be used to determine whether a composite layer comprises discrete layers, interpenetrating networks, or semi-interpenetrating networks. Profilometry can be used to assess how rough the surface of a polymer is, and whether cracks are formed from deposition of the inorganic material (e.g., ceramic material).

Other classes polymers that may be suitable for use in a polymer layer or as polymeric portions include, but are not limited to, polyamines (e.g., poly(ethylene imine) and polypropylene imine (PPI)); polyamides (e.g., polyamide (Nylon), poly(ϵ-caprolactam) (Nylon 6), poly(hexamethylene adipamide) (Nylon 66)), polyimides (e.g., polyimide, polynitrile, and poly(pyromellitimide-1,4-diphenyl ether) (Kapton)); vinyl polymers (e.g., polyacrylamide, poly(2-vinyl pyridine), poly(N-vinylpyrrolidone), poly(methylcyanoacrylate), poly(ethylcyanoacrylate), poly(butylcyanoacrylate), poly(isobutylcyanoacrylate), poly(vinyl acetate), poly (vinyl alcohol), poly(vinyl chloride), poly(vinyl fluoride), poly(2-vinyl pyridine), vinyl polymer, polychlorotrifluoro ethylene, and poly(isohexylcynaoacrylate)); polyacetals; polyolefins (e.g., poly(butene-1), poly(n-pentene-2), polypropylene, polytetrafluoroethylene); polyesters (e.g., polycarbonate, polybutylene terephthalate, polyhydroxybutyrate); polyethers (poly(ethylene oxide) (PEO), poly (propylene oxide) (PPO), poly(tetramethylene oxide) (PTMO)); vinylidene polymers (e.g., polyisobutylene, poly (methyl styrene), poly(methylmethacrylate) (PMMA), poly (vinylidene chloride), and poly(vinylidene fluoride)); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes). In some embodiments, the polymer may be selected from the group consisting of polyvinyl alcohol, polyisobutylene, epoxy, polyethylene, polypropylene, polytetrafluoroethylene, and combinations thereof. The mechanical and electronic properties (e.g., conductivity, resistivity) of these polymers are known.

Accordingly, those of ordinary skill in the art can choose suitable polymers based on their mechanical and/or electronic properties (e.g., ionic and/or electronic conductivity), and/or can modify such polymers to be ionically conducting (e.g., conductive towards single ions) and/or electronically conducting based on knowledge in the art, in combination with the description herein. For example, the polymer materials listed above may further comprise salts, for example, lithium salts (e.g., LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, and LiN(SO$_2$CF$_3$)$_2$), to enhance ionic conductivity. Salts may be added to the a material at a range of, e.g., 0 to 50 mol %. In certain embodiments, salts are included in at least 5 mol %, at least 10 mol %, at least 20 mol %, at least 30 mol %, at least 40 mol %, or at least 50 mol % of the material. In certain embodiments, additional salts are less than or equal to 50 mol %, less than or equal to 40 mol %, less than or equal to 30 mol %, less than or equal to 20 mol %, or less than or equal to 10 mol % of the material. Combinations of the above-noted ranges are also possible. Other values of mol % are also possible.

In some embodiments, the polymer can be ionically conductive, while in other embodiments, the polymer is substantially ionically non-conductive. In some embodiments, the average ionic conductivity of the polymer is at least about $10^{-7}$ S/cm, at least about $10^{-6}$ S/cm, at least about $10^{-5}$ S/cm, at least about $10^{-4}$ S/cm, at least about $10^{-2}$ S/cm, at least about $10^{-1}$ S/cm. In certain embodiments, the average ionic conductivity of the polymer may be less than or equal to about 1 S/cm, less than or equal to about $10^{-1}$ S/cm, less than or equal to about $10^{-2}$ S/cm, less than or equal to about $10^{-3}$ S/cm, less than or equal to about $10^{-4}$ S/cm, less than or equal to about $10^{-5}$ S/cm, less than or equal to about $10^{-6}$ S/cm, less than or equal to about $10^{-7}$ S/cm, or less than or equal to about $10^{-8}$ S/cm. Combinations of the above-referenced ranges are also possible (e.g., an average ionic conductivity of at least about $10^{-8}$ S/cm and less than or equal to about $10^{-1}$ S/cm). Conductivity may be measured at room temperature (e.g., 25 degrees Celsius).

The selection of an appropriate polymer may depend on a number of factors, including the properties of the electrolyte and the anode and cathode used in the electrochemical cell.

In some embodiments, the polymer may be ionically and electronically conductive. Examples of such polymers include, but are not limited to, electrically conductive polymers (also known as electronic polymers or conductive polymers) that are doped with lithium salts (e.g., LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, and LiN(SO$_2$CF$_3$)$_2$). Conductive polymers are known in the art; examples of such polymers include, but are not limited to, poly(acetylene)s, poly(pyrrole)s, poly(thiophene)s, poly(aniline)s, poly(fluorene)s, polynaphthalenes, poly(p-phenylene sulfide), and poly(para-phenylene vinylene)s. Electrically-conductive additives may also be added to polymers to form electrically-conductive polymers. Certain electrically conductive materials may have a conductivity of, e.g., greater than $10^{-2}$ S/cm, greater than $10^{-1}$ S/cm, greater than 1 S/cm, greater than $10^1$ S/cm, greater than $10^2$ S/cm, greater than $10^3$ S/cm, greater than $10^4$ S/cm, or greater than $10^5$ S/cm.

In some embodiments, the polymer may be ionically conductive but substantially non-electrically conductive. Examples of such polymers include non-electrically conductive materials (e.g., electrically insulating materials) that are doped with lithium salts, such as acrylate, polyethylene oxide, silicones, and polyvinyl chlorides.

In some embodiments, the polymeric material included in a composite layer or protective structure is substantially non-swellable in an electrolyte solvent to be used in an electrochemical cell including such a composite layer or protective structure. For instance, the polymeric material may experience a volume change of less than 10%, less than 8%, less than 6%, less than 4%, less than 2%, or less than 1% when in contact with an electrolyte solvent (including any salts or additives present) to be used in an electrochemical cell including such a composite layer or protective structure for at least 24 hours. Simple screening tests of such polymers can be conducted by placing pieces of polymer in the electrolyte solvent (including any salts or additives present) and measuring the volume change of the polymer pieces before and after a 24 hour period, and determining the percentage change in volume relative to the volume before placement in the solvent.

Inorganic material portions or an inorganic material layer described herein (which may be continuous or discontinuous) can be formed of a variety of types of materials. In certain embodiments, the material from which the inorganic material portions/layers is formed may be selected to allow ions (e.g., electrochemically active ions, such as lithium ions) to pass through the material but to substantially impede electrons from passing across the material. By "substantially impedes", in this context, it is meant that in this embodiment the material allows lithium ion flux at least ten times greater than electron passage.

In some embodiments, the material used for an inorganic material portion or layer has a high enough conductivity (e.g., at least $10^{-6}$ S/cm, or another conductivity value described herein) in its first amorphous state. The material may also be chosen for its ability to form smooth, dense and homogenous thin portions or films, especially on a polymer portion or layer.

The inorganic material (e.g., ceramic) can be configured to be substantially electronically non-conductive, in certain embodiments, which can inhibit the degree to which the material causes short circuiting of the electrochemical cell. In certain embodiments, all or part of the inorganic material portions or layer can be formed of a material with a bulk electronic resistivity of at least about $10^4$ Ohm-meters, at least about $10^5$ Ohm-meters, at least about $10^{10}$ Ohm-meters, at least about $10^{15}$ Ohm-meters, or at least about $10^{20}$ Ohm-meters. The bulk electronic resistivity may be, in some embodiments, less than or equal to about $10^{20}$ Ohm-meters, or less than or equal to about $10^{15}$ Ohm-meters. Combinations of the above-referenced ranges are also possible. Other values of bulk electronic resistivity are also possible.

In some embodiments, the average ionic conductivity (e.g., metal ion, such as lithium ion, conductivity) of the inorganic material portion or layer (e.g., ceramic) is at least about $10^{-7}$ S/cm, at least about $10^{-6}$ S/cm, at least about $10^{-5}$ S/cm, at least about $10^{-4}$ S/cm, at least about $10^{-3}$ S/cm, at least about $10^{-2}$ S/cm, at least about 10 S/cm, at least about 1 S/cm, or at least about 10 S/cm. The average ionic conductivity may less than or equal to about 20 S/cm, less than or equal to about 10 S/cm, or less than or equal to 1 S/cm. Conductivity may be measured at room temperature (e.g., 25 degrees Celsius).

Inorganic materials described herein (e.g., ceramics, glasses, or glassy-ceramic materials) may be deposited within a polymer matrix by any suitable method such as sputtering (including, but not limited to, diode, DC magnetron, RF, RF magnetron, pulsed, dual magnetron, AC, MF, and reactive), electron beam evaporation, vacuum thermal evaporation (including, but not limited to, resistive, inductive, radiation, and electron beam heating), laser ablation, chemical vapor deposition (CVD), thermal evaporation, plasma enhanced chemical vacuum deposition (PECVD), laser enhanced chemical vapor deposition, and jet vapor deposition.

Deposition of the polymer and/or inorganic material may be carried out in a vacuum or inert atmosphere to minimize side reactions in the deposited layers that could introduce impurities into the layers or which may affect the desired morphology of the layers. In some embodiments, the deposition of the polymer and/or inorganic material is carried out under atmospheric conditions.

In some embodiments, the inorganic material (e.g., ceramic) may include a glass conductive to metal ions. Suitable glasses include, but are not limited to, those that may be characterized as containing a "modifier" portion and a "network" portion, as known in the art. The modifier may include a metal oxide of the metal ion conductive in the glass. The network portion may include a metal chalcogenide such as, for example, a metal oxide or sulfide.

In some embodiments, the inorganic material (e.g., ceramic) may comprise a material including one or more of lithium nitrides, lithium silicates, lithium borates, lithium aluminates, lithium phosphates, lithium phosphorus oxynitrides, lithium silicosulfides, lithium germanosulfides, lithium oxides (e.g., $Li_2O$, $LiO$, $LiO_2$, $LiRO_2$, where R is a rare earth metal), lithium lanthanum oxides, lithium titanium oxides, lithium borosulfides, lithium aluminosulfides, and lithium phosphosulfides, oxy-sulfides (e.g., lithium oxy-sulfides) and combinations thereof. In some embodiments, the inorganic material (e.g., ceramic) may comprise $Al_2O_3$, $ZrO_2$, $SiO_2$, $CeO_2$, and/or $Al_2TiO_5$. The selection of the inorganic material (e.g., ceramic) will be dependent on a number of factors including, but not limited to, the properties of electrolyte and the anode and cathode used in the cell.

Those of ordinary skill in the art, given the present disclosure, would be capable of selecting appropriate materials for use as polymeric portions or inorganic material portions or layers. Relevant factors that might be considered when making such selections include the ionic conductivity of the materials; the ability to deposit or otherwise form the material on or with other materials in the electrochemical cell; the flexibility of the material; the porosity or non-porosity of the material (e.g., overall porosity, pore size distribution, and/or tortuosity); the compatibility of the material with the fabrication process used to form the electrochemical cell; the compatibility of the material with the electrolyte of the electrochemical cell; and/or the ability to adhere the material to another material or layer. In certain embodiments, the material can be selected based on its ability to survive deposition processes without mechanically failing. For example, in embodiments in which relatively high temperatures or high pressures are used to form the ion conductor material (e.g., a ceramic ion conductor material), a polymer material can be selected or configured to withstand such high temperatures and pressures.

Those of ordinary skill in the art can employ a simple screening test to select an appropriate material from candidate materials. One simple screening test involves positioning a material in an electrochemical cell which, to function, requires passage of an ionic species across the material while maintaining electronic separation. This is a simple test to employ. If the material is substantially ionically conductive in this test, then electrical current will be generated upon discharging the electrochemical cell. A screening test may also involve testing the adhesion between polymeric and inorganic material portions as described herein. Another screening test may involve testing the ability of the polymer to not swell in the presence of an electrolyte to be used in an electrochemical cell. Other simple tests can be conducted by those of ordinary skill in the art.

The inorganic material portions of a composite layer described herein may, in some embodiments, be isolated regions within the layer (i.e., they may be discontinuous regions within the layer). In other embodiments, the inorganic material portions form a continuous layer.

As noted above, the electrode and/or protective structures described herein may be arranged in an electrochemical cell comprising an electrolyte. The electrolytes used in electrochemical or battery cells can function as a medium for the storage and transport of ions, and in the special case of solid electrolytes and gel electrolytes, these materials may additionally function as a separator between the anode and the cathode. Any liquid, solid, or gel material capable of storing and transporting ions may be used, so long as the material facilitates the transport of ions (e.g., lithium ions) between the anode and the cathode. The electrolyte is electronically non-conductive to prevent short circuiting between the anode and the cathode. In some embodiments, the electrolyte may comprise a non-solid electrolyte. Suitable non-aqueous electrolytes may include organic electrolytes comprising one or more materials selected from the group consisting of liquid electrolytes, gel polymer electrolytes, and solid polymer electrolytes.

Examples of useful non-aqueous liquid electrolyte solvents include, but are not limited to, non-aqueous organic solvents, such as, for example, N-methyl acetamide, acetonitrile, acetals, ketals, esters, carbonates, sulfones, sulfites, sulfolanes, aliphatic ethers, acyclic ethers, cyclic ethers, glymes, polyethers, phosphate esters, siloxanes, dioxolanes, N-alkylpyrrolidones, substituted forms of the foregoing, and blends thereof. Examples of acyclic ethers that may be used include, but are not limited to, diethyl ether, dipropyl ether, dibutyl ether, dimethoxymethane, trimethoxymethane, dimethoxyethane, diethoxyethane, 1,2-dimethoxypropane, and 1,3-dimethoxypropane. Examples of cyclic ethers that may be used include, but are not limited to, tetrahydrofuran, tetrahydropyran, 2-methyltetrahydrofuran, 1,4-dioxane, 1,3-dioxolane, and trioxane. Examples of polyethers that may be used include, but are not limited to, diethylene glycol dimethyl ether (diglyme), triethylene glycol dimethyl ether (triglyme), tetraethylene glycol dimethyl ether (tetraglyme), higher glymes, ethylene glycol divinylether, diethylene glycol divinylether, triethylene glycol divinylether, dipropylene glycol dimethyl ether, and butylene glycol ethers. Examples of sulfones that may be used include, but are not limited to, sulfolane, 3-methyl sulfolane, and 3-sulfolene. Fluorinated derivatives of the foregoing are also useful as liquid electrolyte solvents. Mixtures of the solvents described herein can also be used. In some cases, aqueous solvents can be used as electrolytes for lithium cells. Aqueous solvents can include water, which can contain other components such as ionic salts. In some embodiments, the electrolyte can include species such as lithium hydroxide, or other species rendering the electrolyte basic, so as to reduce the concentration of hydrogen ions in the electrolyte.

Liquid electrolyte solvents can also be useful as plasticizers for gel polymer electrolytes, i.e., electrolytes comprising one or more polymers forming a semi-solid network. Examples of useful gel polymer electrolytes include, but are not limited to, those comprising one or more polymers selected from the group consisting of polyethylene oxides, polypropylene oxides, polyacrylonitriles, polysiloxanes, polyimides, polyphosphazenes, polyethers, sulfonated polyimides, perfluorinated membranes (NAFION resins), polydivinyl polyethylene glycols, polyethylene glycol diacrylates, polyethylene glycol dimethacrylates, derivatives of the foregoing, copolymers of the foregoing, crosslinked and network structures of the foregoing, and blends of the foregoing, and optionally, one or more plasticizers. In some embodiments, a gel polymer electrolyte comprises between 10-20%, 20-40%, between 60-70%, between 70-80%, between 80-90%, or between 90-95% of a heterogeneous electrolyte by volume.

In some embodiments, one or more solid polymers can be used to form an electrolyte. Examples of useful solid polymer electrolytes include, but are not limited to, those comprising one or more polymers selected from the group consisting of polyethers, polyethylene oxides, polypropylene oxides, polyimides, polyphosphazenes, polyacrylonitriles, polysiloxanes, derivatives of the foregoing, copolymers of the foregoing, crosslinked and network structures of the foregoing, and blends of the foregoing.

In addition to electrolyte solvents, gelling agents, and polymers as known in the art for forming electrolytes, the electrolyte may further comprise one or more ionic electrolyte salts, also as known in the art, to increase the ionic conductivity.

Examples of ionic electrolyte salts for use in the electrolytes of the present invention include, but are not limited to, LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, and LiN(SO$_2$CF$_3$)$_2$. Other electrolyte salts that may be useful include lithium polysulfides (Li$_2$Sx), and lithium salts of organic ionic polysulfides (LiSxR)$_n$, where x is an integer from 1 to 20, n is an integer from 1 to 3, and R is an organic group.

As described herein, in some embodiments, an electrolyte may be present as a polymer layer adjacent a protective structure (e.g., on a side opposite the electroactive layer). The polymer layer may be, in some embodiments, a gel polymer layer. In some cases, in addition to being able to function as a medium for the storage and transport of ions, a polymer layer positioned between an anode and cathode can function to screen the anode (e.g., a base electrode layer of the anode) from any cathode roughness under an applied force or pressure, keeping the anode surface smooth under force or pressure, and/or stabilizing any protective structures of the anode by keeping the protective structure pressed between the base electrode layer and the electrolyte layer. In some such embodiments, the polymer layer may be chosen to be compliant and have a smooth surface.

An electrolyte layer including a gel may have a three-dimensional network comprising a liquid and a binder component, in which the liquid is entrained by and not allowed to flow through the binder. Gels can be formed when liquids are entrained within a three-dimensional network of solids upon applying the liquid to the solid network. In some cases, the three-dimensional network within a gel can comprise a liquid entrained within a polymer (e.g., a cross-linked polymer). One of ordinary skill in the art would be capable of determining the difference between a gel and other combinations of a solid and a fluid (e.g., a porous separator and a liquid solvent) by measuring, for example, the absorption stiffness of the gel via a dibutyl phthalate (DBP) uptake test. For this test, a dry sample of the binder material is weighed. The weighed sample is immersed in DBP for 30 min. The excess DBP is removed by absorbent paper and the sample is weighed again. Generally, upon exposure of the binder component of a gel to a liquid, the weight of the gel will increase, while the weight of a porous separator will not substantially increase. In some embodiments, the binder component of the gel is able to take up liquid in the substantial absence of pores greater than about 10 microns or greater than about 1 micron. The binder component of a gel can be substantially free of pores in some cases.

In some embodiments, an electrolyte comprising a polymer gel is formed by using a hard ionically conductive polymer and optionally swelling at least a portion of the polymer in a solvent to form a gel. In another embodiment, a mixture of hard and softer polymers can be used, in which at least one, or both, of such polymers is ionically conductive. In another embodiment, an electrolyte includes a rigid, non-swelling scaffold (e.g., like a standard separator as described herein), which is filled with a polymer, such as a conductive polymer. The above-noted embodiments may optionally include particles (e.g., silica particles added to the polymers). In some embodiments, the above-noted embodiments may optionally include some degree of crosslinking. The polymers may be swollen in a solvent as described herein.

In some embodiments, a polymer gel may include a polyethersulfone. Polyethersulfones are polymeric materials that exhibit SO$_2$ groups (sulfonyl groups) and oxygen atoms that form part of ether groups in their constitutional repeating units. Polyethersulfones can be aliphatic, cycloaliphatic or aromatic polyethersulfones. In certain embodiments, one or more branched polyimide, polyvinylalcohol or a blend of polyvinylalcohol (PVOH) and additional (co)polymer(s) can be used.

A polymer electrolyte gel may include, in some embodiments, materials based on a polymer (e.g., non-porous polyvinylalcohol) as a non-fluid material swollen with a solvent having affinity to the polymer. E.g., for PVOH, the solvent may include dimethylacetamide (DMAc), N-methylpyrrolidone (NMP), dimethylsulfoxide (DMSO), dimethylformamide (DMF), sulfolanes and/or sulfones. In certain embodiments, the polymer may be swollen in a solvent mixture comprising a solvent having affinity to polymer and also solvents having no affinity to the polymer (so-called non-solvents) such as, for PVOH, 1,2.dimethoxyethane (DME), diglyme, triglyme, 1,3-dioxolane (DOL), THF, 1,4-dioxane, cyclic and linear ethers, esters (carbonates as dimethylcarbonate and ethylene carbonate), acetals and ketals. The solvents for preparing the polymer gel may be selected from the solvents described herein and may comprise electrolyte salts, including lithium salts selected from the lithium salts described herein.

In certain embodiments, polymer electrolyte gels may be prepared from branched and hyperbranched polyimides. Hyperbranched polyimides are a subclass of branched polyimides. They are composed of highly branched macromolecules in which any linear subchain may lead in either direction to at least two other subchains.

In other embodiments, polymer electrolyte gels may be prepared materials such as cyanoethylated cellulose, polyether ether ketones and sulfonated polyether ether ketones.

In some embodiments a polymer gel is crosslinked with a suitable cross-linker. Examples of cross-linkers may include ones selected from molecules with two or more carbon-carbon double bonds, e.g., ones with two or more vinyl groups. Particularly useful cross-linkers are selected from di(meth)acrylates of diols such as glycol, propylene glycol, diethylene glycol, dipropylene glycol, 1,3-propanediol, 1,4-butanediol, triethylene glycol, tetrapropylene glycol, cyclopentadiene dimer, 1,3-divinyl benzene, and 1,4-divinyl benzene. Some suitable cross-linkers may comprise two or more epoxy groups in the molecule, such as, for example, bis-phenol F, bis-phenol A, 1,4-butanediol diglycidyl ether, glycerol propoxylate triglycidyl ether, and the like. Cross-linking can be achieved by, for example, adding cross-linker to a polymer and performing a cross-linking reaction, e.g., by thermal or photochemical curing, e.g. by irradiation with such as UV/vis irradiation, by γ-irradiation, electron beams (e-beams) or by heating (thermal cross-linking).

In some embodiments, one or more solid polymers can be used to form an electrolyte. Examples of useful solid polymer electrolytes include, but are not limited to, those comprising one or more polymers selected from the group consisting of polyethers, polyethylene oxides, polypropylene oxides, polyimides, polyphosphazenes, polyacrylonitriles, polysiloxanes, derivatives of the foregoing, copolymers of the foregoing, crosslinked and network structures of the foregoing, and blends of the foregoing.

In some embodiments, an electrolyte layer described herein may have a thickness of at least 1 micron, at least 5 microns, at least 10 microns, at least 15 microns, at least 20 microns, at least 25 microns, at least 30 microns, at least 40 microns, at least 50 microns, at least 70 microns, at least 100 microns, at least 200 microns, at least 500 microns, or at least 1 mm. In some embodiments, the thickness of the electrolyte layer is less than or equal to 1 mm, less than or equal to 500 microns, less than or equal to 200 microns, less than or equal to 100 microns, less than or equal to 70 microns, less than or equal to 50 microns, less than or equal to 40 microns, less than or equal to 30 microns, less than or equal to 20 microns, less than or equal to 10 microns, or less than or equal to 50 microns. Other values are also possible. Combinations of the above-noted ranges are also possible.

The protected electrode structures described herein may apply to an anode or cathode.

In some embodiments, the electrode may be arranged in an electrochemical cell. That cell, in certain cases, may be a primary (non-rechargeable) battery. In other cases, the electrochemical cell may be a secondary (rechargeable) battery. Many embodiments described herein involve lithium rechargeable batteries. However, wherever lithium batteries are described herein, it is to be understood that any analogous alkali metal battery can be used. Additionally, although embodiments of the invention are particularly useful for protection of a lithium anode, the present invention may be applicable to other applications in which electrode protection is desired.

The electrode described herein may comprise a base layer comprising an active electrode species. In certain cases, the electrode is an anode. The anode, in some embodiments, comprises lithium. The anode may comprise or be formed of lithium metal. The lithium metal may be in the form of, e.g., a lithium metal foil or a thin lithium film that has been deposited on a substrate. The lithium metal may also be in the form of a lithium alloy, such as, for example, a lithium-tin alloy or a lithium-aluminum alloy. In some embodiments, lithium metal may be deposited (e.g., vacuum deposited) directly onto a protective structure described herein.

In some embodiments, the electrode is a cathode. Suitable cathode active materials for use in the cathode of the electrochemical cells of the invention include, but are not limited to, electroactive transition metal chalcogenides, electroactive conductive polymers, and electroactive sulfur-containing materials, and combinations thereof. As used herein, the term "chalcogenides" pertains to compounds that contain one or more of the elements of oxygen, sulfur, and selenium. Examples of suitable transition metal chalcogenides include, but are not limited to, the electroactive oxides, sulfides, and selenides of transition metals selected from the group consisting of Mn, V, Cr, Ti, Fe, Co, Ni, Cu, Y, Zr, Nb, Mo, Ru, Rh, Pd, Ag, Hf, Ta, W, Re, Os, and Ir. In one embodiment, the transition metal chalcogenide is selected from the group consisting of the electroactive oxides of nickel, manganese, cobalt, and vanadium, and the electroactive sulfides of iron. In certain embodiments, the cathode may include as an electroactive species elemental sulfur, sulfides, and/or polysulfides. In other embodiments, an intercalation electrode (e.g., a lithium-intercalation cathode) may be used. Non-limiting examples of suitable materials that may intercalate ions of an electroactive material (e.g., alkaline metal ions) include oxides, titanium sulfide, and iron sulfide. Additional examples include $Li_xCoO_2$, $Li_xNiO_2$, $LixMnO_2$, $LixMn_2O_4$, $Li_xFePO_4$, $Li_xCoPO_4$, $Li_xMnPO_4$, and $Li_xNiPO_4$, where $(0<x\leq1)$, and $LiNi_xMn_yCo_zO_2$ where $(x+y+z=1)$.

In one embodiment, the cathode active layer comprises an electroactive conductive polymer. Examples of suitable electroactive conductive polymers include, but are not limited to, electroactive and electronically conductive polymers selected from the group consisting of polypyrroles, polyanilines, polyphenylenes, polythiophenes, and polyacetylenes. In some embodiments, the conductive polymer may be one or more of polypyrroles, polyanilines, and polyacetylenes.

In some embodiments, the electrode is arranged in an electrochemical cell that comprises an electrolyte. The electrolyte can comprise one or more ionic electrolyte salts to provide ionic conductivity and one or more liquid electrolyte solvents, gel polymer materials, or polymer materials. Examples of suitable electrolytes are provided in further detail below.

In some embodiments, the electrode may comprise a gel layer (e.g., a gel electrolyte) between the base layer comprising an active species and the protective structure comprising a polymer and an inorganic material. The protective structure may, in some cases, be in direct contact with a gel, an electrolyte, a separator positioned between the anode and the cathode, and/or a temporary carrier substrate in an electrochemical cell.

In some embodiments, there may be a substrate on one side of the electrode. Substrates may be useful as a support on which to deposit the electrode active material, and they may provide additional stability for handling during cell fabrication. Further, in the case of conductive substrates, a substrate may also function as a current collector useful in efficiently collecting the electrical current generated throughout the electrode and in providing an efficient surface for attachment of electrical contacts leading to an external circuit. Suitable substrates include, but are not limited to, those selected from the group consisting of metal foils, polymer films, metallized polymer films, electrically conductive polymer films, polymer films having an electrically conductive coating, electrically conductive polymer films having an electrically conductive metal coating, and polymer films having conductive particles dispersed therein. In one embodiment, the substrate is a metallized polymer film. In other embodiments, described more fully below, the substrate may be selected from non-electrically-conductive materials. In certain embodiments, however, a substrate may not be needed.

An electrochemical cell described herein ma include a separator. Generally, a separator is interposed between a cathode and an anode in an electrochemical cell. The separator may separate or insulates the anode and the cathode from each other preventing short circuiting, and permit the transport of ions between the anode and the cathode. The separator may be porous, wherein the pores may be partially or substantially filled with electrolyte. Separators may be supplied as porous free standing films which are interleaved with the anodes and the cathodes during the fabrication of cells. Alternatively, the porous separator layer may be applied directly to the surface of one of the electrodes.

Accordingly, in certain embodiments, an electrolyte layer may include a solid portion (e.g., a solid porous network such as a solid electrolyte and/or a separator) and a liquid portion and/or gel portion as described herein. The pores of the solid portion of the electrolyte layer may have an average size of, for example, greater than 0.01 microns, greater than 0.05 microns, greater than 0.1 microns, greater than 0.5 microns, greater than 1 micron, greater than 2 microns, or greater than 5 microns. In some cases, the pores of the solid portion of the electrolyte layer may have an average size of, for example, less than 5 microns, less than 3 microns, less than 2 microns, less than 1 micron, less than 0.5 microns, less than 0.1 microns, less than 0.05 microns, or less than 0.1 microns. Other sizes are also possible. Combinations of the above-noted ranges are also possible.

In some embodiments, the porosity of separator can be, for example, at least 30%, at least 40%, at least 50%, at least 60%, at least 70%, at least 80%, or at least 90%. In certain embodiments, the porosity is less than 90%, less than 80%, less than 70%, less than 60%, less than 50%, less than 40%, or less than 30%. Other sizes are also possible. Combinations of the above-noted ranges are also possible.

Separators may be supplied as porous free standing films which are interleaved with the anodes and the cathodes during the fabrication of cells. Alternatively, the porous separator layer may be applied directly to the surface of one of the electrodes, for example, as described in PCT Publication No. WO 99/33125 to Carlson et al. and in U.S. Pat. No. 5,194,341 to Bagley et al.

A variety of separator materials are known in the art. Examples of suitable solid porous separator materials include, but are not limited to, polyolefins, such as, for example, polyethylenes (e.g., SETELA™ made by Tonen Chemical Corp) and polypropylenes, glass fiber filter papers, and ceramic materials. For example, in some embodiments, the separator comprises a microporous polyethylene film. Further examples of separators and separator materials suitable for use in this invention are those comprising a microporous xerogel layer, for example, a microporous pseudo-boehmite layer, which may be provided either as a free standing film or by a direct coating application on one of the electrodes, as described in U.S. Pat. Nos. 6,153,337 and 6,306,545 by Carlson et al. of the common assignee. Solid electrolytes and gel electrolytes may also function as a separator in addition to their electrolyte function.

In some embodiments, the separator can comprise synthetic or non-synthetic organic polymeric materials, and can be selected from polymer/ceramic material hybrid systems such as polymer non-woven materials coated with a ceramic material. Suitable materials for the separator are polyolefins (e.g., polyethylene or polypropylene) and fluorinated (co) polymers. The separator can comprise a microporous film, in some cases.

The following examples are intended to illustrate certain embodiments of the present invention, but do not exemplify the full scope of the invention.

Example 1

This Example describes the fabrication of a protective structure including a composite of inorganic material (ceramic) and polymer portions.

Figure 8A:
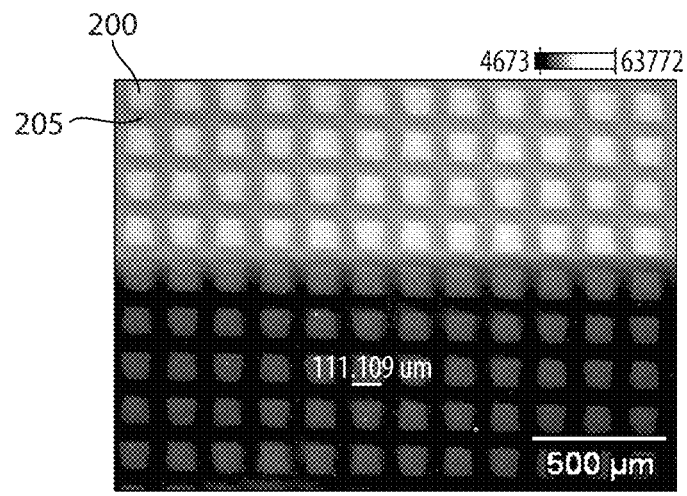
FIGS. 8A and 8B show patterns of ceramic islands on a substrate according to one set of embodiments.
Figure 8B:
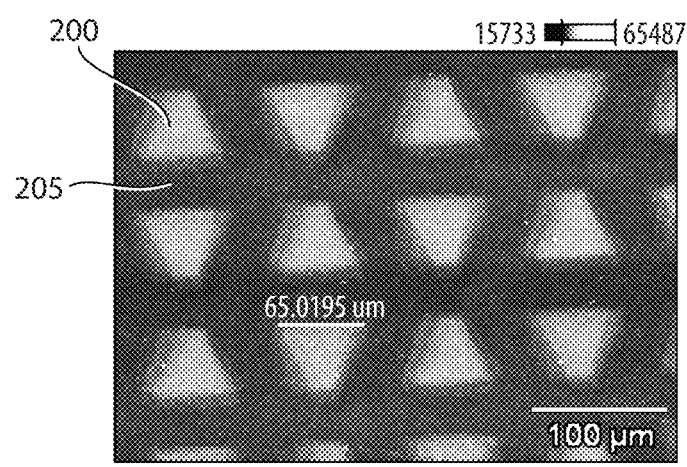
Figure 9A:
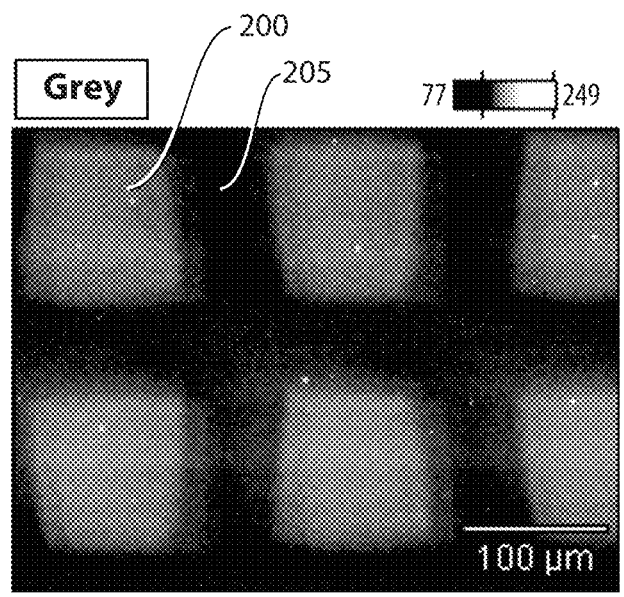
FIG. 9A shows an image of the ceramic pattern of FIG. 8A.
Figure 9B:
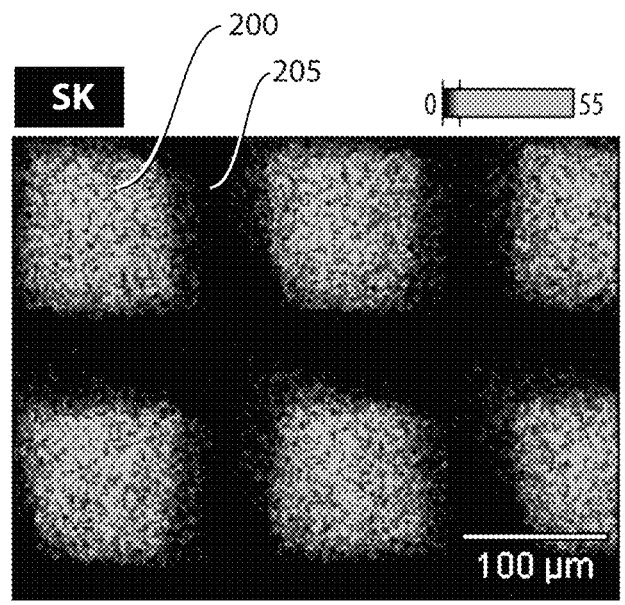
FIG. 9B shows an EDS mapping of the ceramic pattern of FIG. 9A.

A shadow mask was first positioned on a substrate. Electron beam evaporation was then used to deposit a 0.5 µm-thick layer of an oxysulfide ceramic on the substrate. The shadow mask was removed, leaving a pattern of ceramic islands separated by voids or trenches. FIGS. 8A and 8B show images of ceramic patterns on a substrate. In the images, the lighter regions 200 are the ceramic islands, and the darker regions 205 are the voids between the islands. The ceramic islands were also characterized using Energy Dispersive Spectroscopy (EDS). FIG. 9A shows another image of the ceramic pattern of FIG. 8A, and FIG. 9B shows an EDS mapping of the ceramic pattern.

Figure 10A:
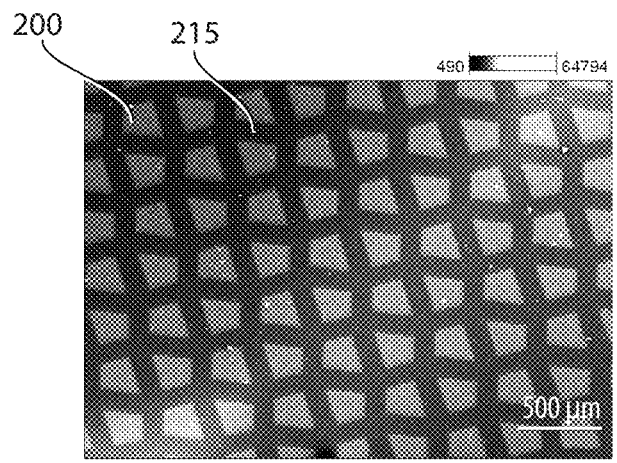
FIGS. 10A and 10B show images of a ceramic-polymer composite structure according to one set of embodiments.
Figure 10B:
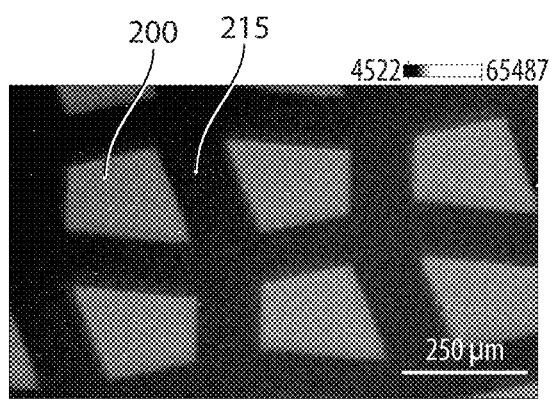

A spin coater was used to coat the top surfaces of the ceramic islands with a silicon oil. The silicon oil acted as a de-wetting agent that prevented a polymer from adhering to the top surfaces of the ceramic islands. A spin coater was then used to fill the voids in the ceramic pattern with a 0.5 µm-thick layer of a polymer (Oppanol B15, an polyisobutene). The polymer was then dried. FIGS. 10A-10B show images of the ceramic-polymer composite structure, with ceramic portions 200 and polymeric portions 215.

Due to the presence of the silicon oil de-wetting agent, the polymer did not adhere to the top surfaces of the ceramic islands. To demonstrate that the polymer coating was not present on the top surfaces of the ceramic islands, the polymer-ceramic structure was exposed to liquid nitrogen, which caused the ceramic portions of the structure to fracture. EDS was used to show that the polymer was located within voids between the ceramic islands.

Following spin coating of the polymer into the voids and drying of the polymer, the polymer-ceramic structure was plasma treated to remove any silicon oil residue on the exposed ceramic surfaces. The polymer-ceramic structure was then ready to be coated with lithium metal or with another protective layer (e.g., another ceramic-polymer structure). The protective structure (along with lithium metal, if present) can then be released from the substrate.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An electrode for an electrochemical cell, comprising:
   a base layer comprising an active electrode species; and
   a protective structure positioned to protect the electrode from an electrolyte when the electrode is arranged in the electrochemical cell, the protective structure having a first side facing the active electrode species, and a second side arranged to face the electrolyte, wherein the protective structure comprises:
      at least a first and second composite layer, each layer comprising:
         a polymer matrix having a plurality of cavities; and
         a ceramic material filling at least two cavities of the plurality of cavities; and
      a continuous ceramic material layer positioned between the first and second composite layers,
      wherein each ceramic-filled cavity is in ionic communication with the base layer, wherein the protective structure has an average ionic conductivity of at least $10^{-7}$ S/cm, and wherein the cavities in the second composite layer are aligned with the cavities in the first composite layer.

2. The electrode of claim 1, wherein the protective structure is impervious to the electrolyte.

3. The electrode of claim 1, wherein the plurality of cavities are arranged in a patterned array within the matrix.

4. The electrode of claim 1, wherein a gel layer is positioned adjacent the protective structure on a side opposite the base layer.

5. The electrode of claim 1, wherein the electrode comprises at least a third composite layer comprising a polymer matrix having a plurality of cavities and a ceramic material filling at least two cavities of the plurality of cavities.

6. The electrode of claim 1, wherein the weight of the polymer in the protective structure is at least 2% of the total weight of the protective structure.

7. The electrode of claim 1, wherein a ratio of the sum of the surface areas of the ceramic-filled cavities to the surface area of the electrode is at least 0.3.

8. The electrode of claim 1, wherein the electrode is an anode.

9. The electrode of claim 1, wherein the active electrode species comprises lithium.

10. The electrode of claim 1, wherein the polymer matrix is non-ionically conductive.

11. The electrode of claim 1, wherein the ceramic material is conductive to lithium ions.

12. The electrode of claim 1, wherein the ceramic material is selected from the group consisting of $Li_2O$, $Li_3N$, $Al_2O_3$, $ZrO_2$, $SiO_2$, $CeO_2$, $Al_2TiO_5$, oxy-sulfide glass, and combinations thereof.

13. The electrode of claim 1, wherein the protective structure has a thickness of at least 500 nm.

14. The electrode of claim 1, wherein the elastic modulus of the polymer matrix is at least 2 times smaller than the elastic modulus of the ceramic material.

15. The electrode of claim 1, wherein each cavity of the plurality of cavities is filled with the same material.

16. The electrode of claim 1, wherein an average largest cross-sectional dimension of the plurality of cavities is less than or equal to 10 microns.

17. The electrode of claim 1, wherein an average cross-sectional dimension of the plurality of cavities is greater than or equal to 5 nm.

18. An electrode for an electrochemical cell, comprising:
a base layer comprising an active electrode species; and
a protective structure including:
at least a first composite layer and a second composite layer, each comprising a patterned array of cavities within a matrix, wherein a polymer or a ceramic material forms the matrix, and the other of the polymer and the ceramic material fills at least a portion of the cavities; and
a continuous ceramic material layer positioned between the first and second composite layers,
wherein the protective structure has an average ionic conductivity of at least $10^{-7}$ S/cm, wherein the cavities in the second composite layer are aligned with the cavities in the first composite layer, and wherein the protective structure is positioned to protect the electrode from an electrolyte when the electrode is arranged in the electrochemical cell.

19. The electrode of claim 18, wherein the protective structure is impervious to the electrolyte.

20. A method of fabricating a protected electrode, the method comprising:
forming a base layer comprising an active electrode species attached to a protective structure, wherein the protective structure is formed by:
positioning on a substrate at least one layer comprising a first matrix, the first matrix comprising a first polymer or a first ceramic material, and the first matrix comprising a patterned array of cavities;
filling at least a portion of the cavities in the first matrix with the other of the first polymer and the first ceramic material to form a first composite layer;
positioning a continuous ceramic material layer on the first layer of the matrix;
positioning on the continuous ceramic material layer at least a second layer comprising a second matrix, the second matrix comprising a second polymer or a second ceramic material, and the second matrix comprising a patterned array of cavities;
filling at least a portion of the cavities in the second matrix with the other of the second polymer and the second ceramic material to form a second composite layer,
wherein the composite layer has an average ionic conductivity of at least $10^{-7}$ S/cm, wherein the cavities in the second composite layer are aligned with the cavities in the first composite layer, and wherein the protective structure is positioned to protect the electrode from an electrolyte when the electrode is arranged in an electrochemical cell.

21. The method of claim 20, wherein the composite layer is impervious to the electrolyte.

* * * * *